United States Patent [19]

Wieler

[11] Patent Number: 5,027,122

[45] Date of Patent: Jun. 25, 1991

[54] METHOD AND APPARATUS FOR DOPPLER VELOCITY DE-ALIASING

[75] Inventor: James G. Wieler, Medway, Mass.

[73] Assignee: Raytheon Company, Lexington, Mass.

[21] Appl. No.: 491,770

[22] Filed: Mar. 12, 1990

[51] Int. Cl.[5] ............................................. G01S 13/95
[52] U.S. Cl. ...................................................... 342/26
[58] Field of Search .......................................... 342/26

[56] References Cited

PUBLICATIONS

Efficient Dealiasing of Doppler Velocities Using Local Environmental Constraints, Michael D. Eilts and Steven D. Smith, NOAA, Environmental Research Laboratories, National Severe Storms Laboratory, Norman, Okla., Technical Report Documentation, p. i, preface pp. iii–vii, pp. 2–37 (Jan. 1989).
Two–and Three-Dimensional De-aliasing of Doppler Radar Velocities, William R. Bergen and Steven C. Albers, Journal of Atmospheric and Oceanic Technology, American Meteorological Society 1988, vol. 5, pp. 305–319 (Apr. 1988).
De-Aliasing First-Moment Doppler Estimates, Peter S. Ray and Conrad Ziegler, Journal of Applied Meteorology, National Severe Storms Laboratory, Norman, Okla., May 1977, vol. 16, pp. 563–564.
Automatic Velocity De-Aliasing for Real-Time Applications, Mark W. Merritt, Lincoln Laboratory, Massachusetts Institute of Technology, Lexington, Mass., Sep. 1984, 22nd Conference on Radar Meteorology, pp. 528–533.
Interactive Radar Velocity Unfolding, David W. Bargen and Robert C. Brown, National Center for Atmospheric Research, Boulder, Colo., pp. 278–283 (1980).
Reducing the Effects of Doppler Radar Ambiguities, Larry Hennington, Journal of Applied Meteorology, National Service Storm Laboratory, Norman, Okla., 1981, pp. 1543–1546.
Extension of Maximum Unambiguous Doppler Velocity by Use of Two Sampling Rates, Dale Sirmans, Dusan Zrnic' and Bill Bumgarner, National Severe Storms Laboratory, Norman, Okla., 17th Conference Radar Meterology, 1976, pp. 23–26.
The Simple Rectification to Cartesian Space of Folded Radial Velocities from Doppler Radar Sampling, L. Jay Miller, Carl G. Mohr and Andrew J. Weinheimer, Journal of Atmospheric and Oceanic Technology, National Center for Atmospheric Research, Boulder, Colo., vol. 3, Mar. 1986, pp. 162–174.

Primary Examiner—Gilberto Barrón, Jr.
Attorney, Agent, or Firm—Walter F. Dawson; Richard M. Sharkansky

[57] ABSTRACT

A method and apparatus for real time de-aliasing of the Doppler velocity data in a weather radar system by using a Process Radials routine which processes every valid range gate along a radar dwell by determining if each range gate is within the Nyquist velocity of either the average of four preceding range gates or data from a Windfield Model. To further enhance the de-aliasing process a Process Dual Scans routine is used prior to the Process Radial routine to de-alias velocity data by comparing velocity data from two scans of different pulse repetition frequencies. Subsequent to the Process Radials routine, a Minimize Azimuthal Shear routine checks velocity discontinuities from azimuth to azimuth. The de-aliased data is transferred to an Update Windfield Model routine for quality checks of the de-aliased velocity data and updating of the Windfield Model. This complete method of de-aliasing the velocity data is performed during the real time operation of the radar system.

36 Claims, 8 Drawing Sheets

METHOD AND APPARATUS FOR DOPPLER VELOCITY DE-ALIASING

BACKGROUND OF THE INVENTION

This invention relates to processing data from meteorological radars and in particular to a method and apparatus for de-aliasing Doppler velocity data in a weather radar system in real time.

Pulsed Doppler weather radars have inherent range and velocity ambiguities due to system design factors such as pulse repetition rate and radar frequency. These ambiguities are related by the following relationship:

$$R (VN) = C (lambda/8)$$

where R is the unambiguous range, VN is the unambiguous (Nyquist) velocity, C is the speed of light and lambda is the radar wavelength. This relationship can be rewritten for VN by substituting for maximum unambiguous range the equation $R = C (T/2)$ to yield:

$$VN = \pm lambda/4T,$$

where T is the pulse repetition interval. Doppler velocity aliasing occurs when the magnitude of the radial component of the target's velocity is greater than VN.

The interpretation and automatic data processing of Doppler weather radar data is complicated by the range and velocity ambiguities. These ambiguities can distort the information making interpretation difficult. Such ambiguities also yield false alarms in automatic detection algorithms, increasing false alarm rates and obscuring signatures that decrease the probability of detection of severe weather events. Weather radar systems require that the velocity data be properly de-aliased. Thus it is critical that the method of velocity de-aliasing can keep up with a real time data collection rate.

In the past, several methods have been developed to de-alias Doppler velocities. In a publication entitled "Extension of Maximum Unambiguous Doppler Velocity By Use Of Two Sampling Rates", Amer. Meteor. Soc., Boston, 1976, pp. 23-26, a method of using dual PRFs to de-alias velocity data is discussed. This technique discusses the use of alternating PRFs from pulse to pulse to de-alias data. This technique was never implemented in an operational radar because of problems in changing the transmitter PRF from pulse to pulse. The simplest approach to de-alias velocity data is to apply continuity along the radar radial. This method compares the measured velocity at each range gate with its neighbor and either adds or subtracts an integer number of VN until the difference between the adjacent range gates is within some allowable difference. In a publication entitled "Interactive Radar Velocity Unfolding" by D.W. Bargan and R. Brown, 19th *Conference on Radar Meteorology*, Amer. Meteor. Soc., Boston, 1980, pp. 278-283, a method is described that uses continuity and the average of the preceeding velocities to de-alias the current range gate. However, this method also depended on operator interaction to de-alias the velocity data, and hence it is not suitable for real time applications. In another publication entitled "Automatic Velocity De-aliasing for Real Time Applications", by M.W. Merrit, 22nd Conference on Radar Meteorology, *Amer. Meteor. Soc.*, Boston, 1984, pp. 528-533, a method is described that utilizes a two-dimensional Windfield Model to de-alias the data. This method comprised a multiple step process that groups data into regions of similar velocities where all the velocity data in that region do not differ from one another by more than the Nyquist velocity. The difference between velocities on the edges of these regions were minimized by determining the proper Nyquist interval for each region. The final step uses the Windfield Model to determine the proper velocity for the velocities within the regions. This method was never run in real time and is subject to failure scenario in regions of strong velocity gradients in which aliased data was grouped with regions of data that were not aliased. The Merritt technique was modified in a further publication entitled "Two and Three-Dimensional De-aliasing of Doppler Radar Velocities," by W.R. Bergen and S.C. Albers, *Journal of Atmospheric and Oceanic Technology*, Amer. Meteor. Soc., Boston, Vol. 5, pp. 305-319, which describes adding several preprocessing steps to eliminate noise and data anomalies that cause the technique to fail. This modified technique yields good results, but is not capable of running in real time; it takes 20-30 seconds to process a 360 degree scan (512 range gates) data on a VAX 8800. In another publication entitled "The Simple Rectification to Cartesian Space of Folded Radial Velocities from Doppler Radar Sampling", by Miller et al., *Journal of Atmospheric and Oceanic Technology*, Vol. 3, American Meteorological Society (1986), a technique is described that de-aliases velocity data as part of a cartesian coordinate conversion process. This technique computed a velocity quality parameter to establish the reliability of the de-aliased velocity data. However, this technique does not run in real time and can potentially degrade data resolution.

Data contamination must be minimized prior to processing by a real time velocity de-aliasing method. Not only will contaminated data cause de-aliasing failures, but it can also cause the method to be too slow for a real time application. For these reasons several data quality checks such as ground clutter filtering, signal-to-noise thresholding, spectrum width thresholding, and reflectivity spike removal, should be performed on the data prior to the de-aliasing techniques.

SUMMARY OF THE INVENTION

Accordingly, it is an object of this invention to perform real time de-aliasing of velocity data from a pulse Doppler radar in order to insure proper operation of pattern recognition programs used to generate hazardous weather products for automatic or operator interpretation.

Another object of this invention is to provide a method and apparatus to perform real time de-aliasing of Doppler velocity data in a radar system by means of a Process Radials routine for processing every valid range gate along a radar dwell and then updating a Windfield Model for use with the Process Radials routine, and checking for velocity discontinuities from azimuth-to-azimuth with a Minimize Azimuthal Shear routine.

Another object of this invention is to provide an enhanced method and apparatus to perform real time de-aliasing of Doppler velocity data in a radar system. A Process Dual Scans routine is performed prior to the Process Radials routine to de-alias velocity data by comparing velocity data from two scans at different pulse repetition frequencies; following the Process Radials routine a Minimize Azimuthal Shear routine is performed to check for velocity discontinuities from azimuth-to-azimuth. The de-aliased velocity data is transferred to the Update Windfield Model routine for quality checks of the de-aliased velocity data and updating of the Windfield Model.

The foregoing and other objects are accomplished by a method of operating a processing apparatus in a radar system for real time de-aliasing of Doppler velocity data comprising the steps of storing initialization data for a Windfield Model, processing each range gate return signal of the velocity data along a radar dwell by examining adjacent data along such radar dwell and de-aliasing in accordance with an average of previous range gates when the velocity data is continuous; and when the velocity data is not continuous, using data from the Windfield Model, and updating the Windfield Model with the de-aliased velocity data.

The objects are further accomplished by a weather radar system having apparatus for real time de-aliasing of Doppler velocity data comprising means for transmitting a radar beam of the radar system, means for processing return signals from the radar beam to obtain velocity data, means coupled to the signal processing means for performing the de-aliasing of the velocity data in real time, means for storing in the de-aliasing performing means initialization data of a Windfield Model, a Process Radials routine in said de-aliasing performing means for processing each range gate return signal of the velocity data along a radar dwell by examining adjacent data along the radar dwell and de-aliasing in accordance with an average of previous range gates when the velocity data is continuous and when the velocity data is not continuous using data from the Windfield Model, and an Update Windfield Model routine in the de-aliasing performing means for updating the Windfield Model with the de-aliased velocity data.

The objects are further accomplished by a method of operating a processing apparatus of a radar system for real time de-aliasing of Doppler velocity data comprising the steps of checking for dual scans and when present storing the velocity data of a first scan of the dual scans, processing the velocity data of the dual scans using a velocity difference correction function, the dual scans having different pulse repetition frequencies, storing initialization data for a Windfield Model, processing each range gate return signal of the velocity data along a radar dwell by examining adjacent data along the radar dwell and de-aliasing in accordance with an average of previous range gates when the velocity data is continuous and when the velocity data is not continuous using data from the Windfield Model, operating on the processed velocity data by examining adjacent velocity data of radar dwells in an azimuthal direction to minimize azimuthal shear velocity differences, and updating the Windfield Model with the de-aliased velocity data and in accordance with a trend in radial velocity samples (TV), a trend in average of the velocities (TA), and velocity differences between adjacent Windfield Model sectors.

The objects are further accomplished by apparatus for real time de-aliasing of Doppler velocity data comprising means for checking for dual scans and when present storing the velocity data of a first scan of dual scans, means coupled to the storing means and a radar signal processing means for processing the velocity data of the dual scans using a velocity difference correction function, the dual scans having different pulse repetition frequencies, means for providing initialization data to a Windfield Model in the storing means, and the processing means further comprises means for processing each range gate return signal of the velocity data along a radar dwell by examining adjacent data along the radar dwell and de-aliasing in accordance with an average of previous range gates when the velocity data is continuous and when the velocity data is not continuous using data from the Windfield Model, and the processing means further comprises means for updating the Windfield Model with the de-aliased velocity data.

The objects are further accomplished by a weather radar system having apparatus for real time de-aliasing of Doppler velocity data comprising means for transmitting a radar beam of the radar system at different pulse repetition frequencies, means for processing return signals from the radar beam to obtain said velocity data, means coupled to the signal processing means for performing the real time de-aliasing of the velocity data, means for storing in the de-aliasing performing means initialization data for a Windfield Model, Process Dual Scans routine means in the de-aliasing performing means for checking for dual scans and when present storing in the storing means the velocity data of a first scan of the dual scans and processing the velocity data of the dual scans using a velocity difference correction function, the dual scans having different pulse repetition frequencies, Process Radials routine means in the de-aliasing performing means for processing each range gate return signal of the velocity data along a radar dwell by examining adjacent data along the radar dwell and de-aliasing in accordance with an average of previous range gates when the velocity data is continuous and when the velocity data is not continuous using data from the Windfield Model, Minimize Azimuthal Shear routine means in the de-aliasing performing means for operating on the velocity data by examining adjacent velocity data of the radar dwells in an azimuthal direction to minimize azimuthal shear velocity differences, and an Updating Windfield Model routine means in the de-aliasing performing means for updating the Windfield Model with the de-aliased velocity data during the presence of dual scans and a single scan.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
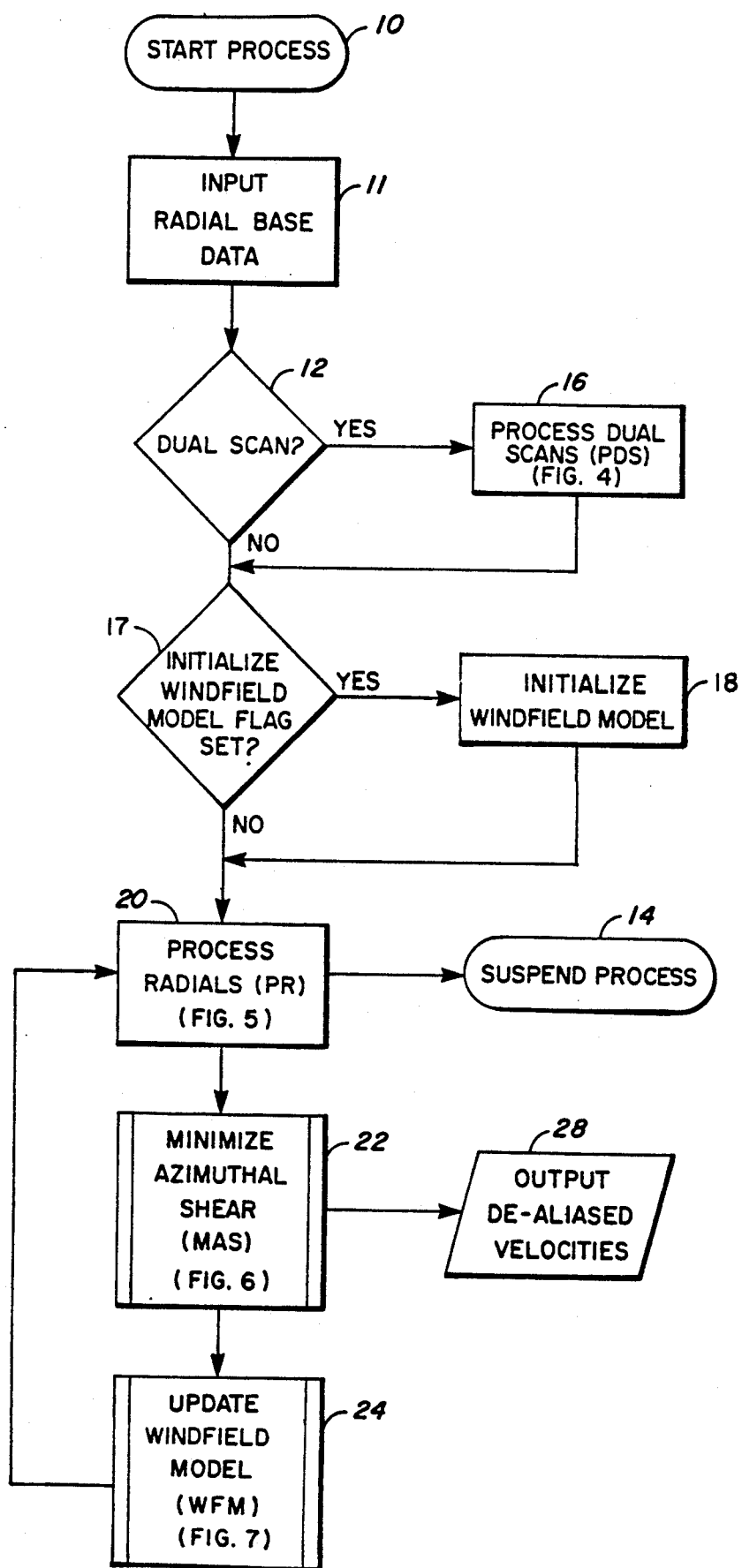
FIG. 1 is a flow chart of the invention.
Figure 2A:
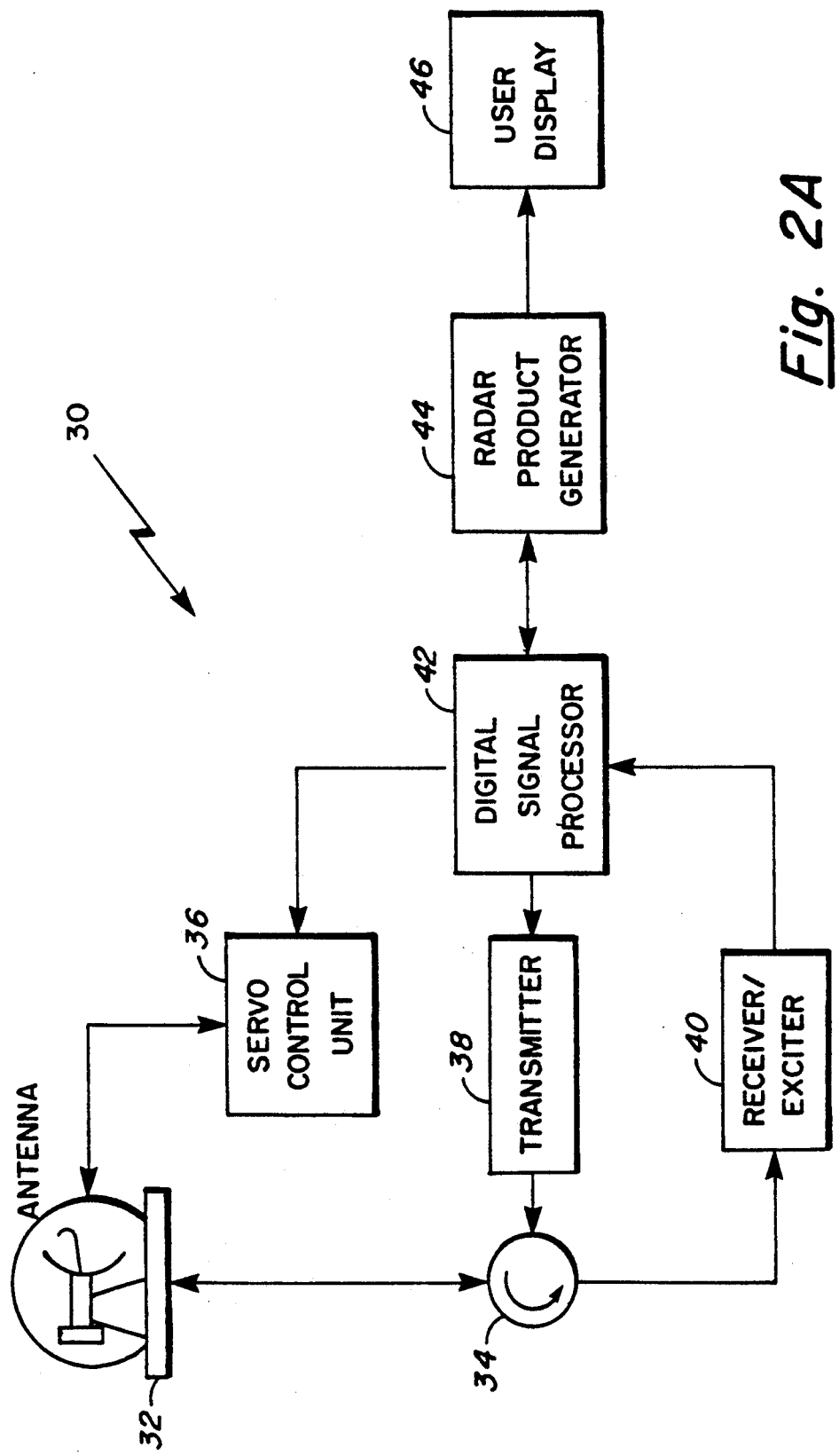
FIG. 2A is a block diagram of weather radar system embodying the invention.

Referring now to FIG. 1 and FIG. 2A, FIG. 1 shows a flow chart of an enhanced method for de-aliasing in real time Doppler velocity data generated by a weather radar system. FIG. 2A is a functional block diagram of such a Weather Radar System 30 employing the method of Doppler velocity de-aliasing.

The Radar System 30 comprises a transmitter 38 and a Receiver/Exciter 40 which are coupled via a Duplexer 34 to a Narrow Beam Antenna 32 for transmitting signals to weather targets (precipitation size particles) and for receiving returned signals. A Servo Control Unit 36 is coupled between the Antenna 32 and a Digital Signal Processor (DSP) 42. The Servo Control Unit 36 is used to control and report the positioning of the Antenna 32; the DSP 42 forms the base data estimates from analog signals. A Radar Product Generator (RPG) 44 coupled to the output of the DSP 42 processes the base data to generate weather products which are coupled to a User Display 46. The User Display 46 displays the products produced by the RPG 44. The velocity de-aliasing means is located in a programmable digital computer within the RPG 44. The RPG 44 receives velocity data from the DSP 42, processes it, and passes it to weather detection programs which in turn pass the data to the User Display 46. The DSP 42 forms the base data comprising power, mean velocity, and spectrum width estimates, and passes this data to the RPG 44 along with ancillary information such as time, azimuth, elevation, and pulse repetition frequency (PRF). The de-aliasing method uses the PRF values along with the velocity data to de-alias the velocity data.

The Antenna 32 of the Weather Radar System 30 transmits and receives data using a narrow beamwidth. This narrow beam is swept through the atmosphere at constant elevation angles for either 360 degrees or over sectors of interest. The data collected from the radar are integrated over one (1) degree, referred to as a radar dwell. After a complete elevation scan the antenna elevation angle is altered and the data collection is commenced at the new elevation angle. This process of data collection continues over the entire volume of interest. The Weather Radar System 30 completes this volumetric coverage once every five minutes. In order to complete the volumetric scanning sequence in the required time, it is necessary for the antenna to rotate at a rate of 30 degrees per second. The real time de-aliasing method of the present invention must be completed before the arrival of the next 1 degree radar dwell.

Figure 2B:
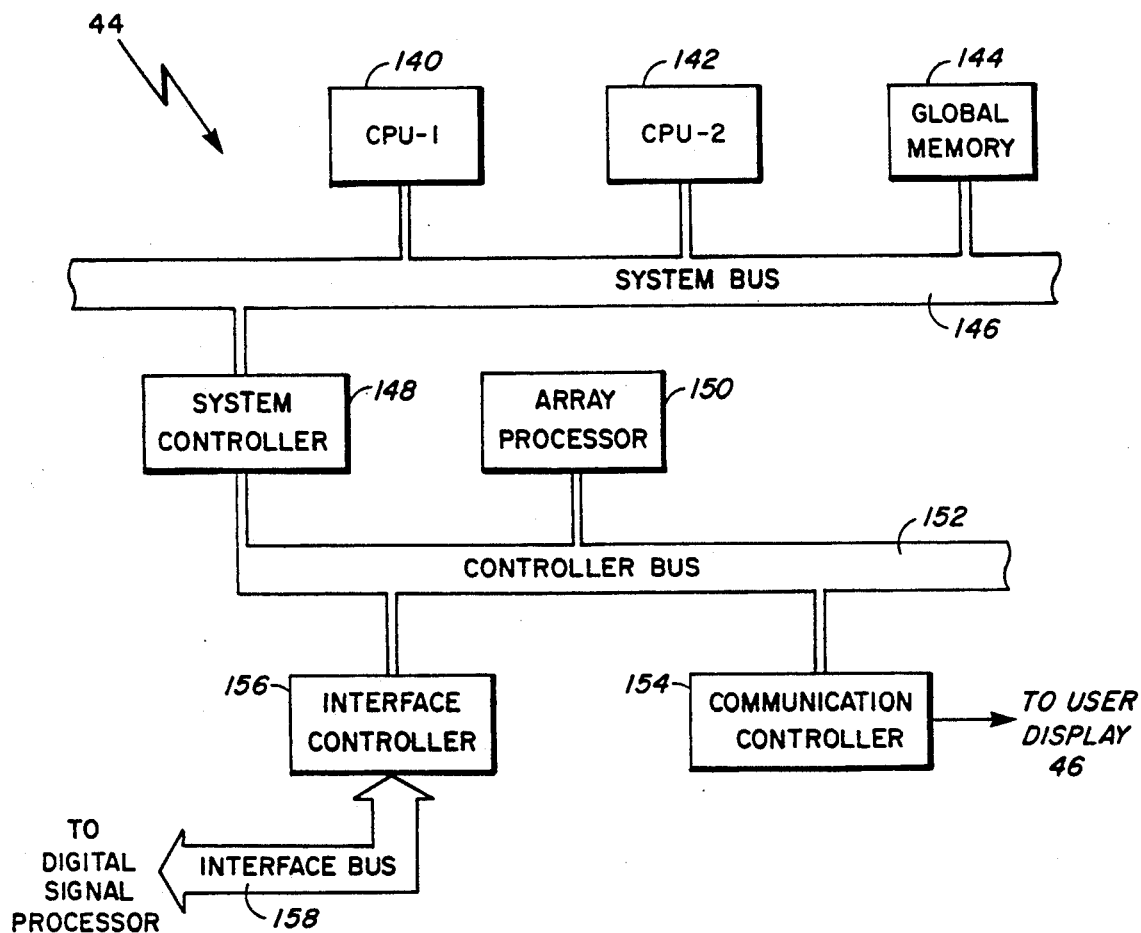
FIG. 2B is a block diagram of the Radar Product Generator shown in block form in FIG. 1.

Referring now to FIG. 2B, a block diagram of the Radar Product Generator (RPG) 44 is shown comprising an Interface Controller 156 coupled to the Digital Signal Processor 42 by an Interface Bus 158 and a Communication Controller 154 which is coupled to the User Display 46. Within the RPG 44 a System Bus 146 interconnects a Central Processing Unit-1 (CPU-1) 140, a CPU-2 142, a Global Memory 144 and a System Controller 148. The System Controller 148 is also coupled to a Controller Bus 152 which interconnects the System Controller 148, an Array Processor 150, the Interface Controller 156 and the Communication Controller 154. The method for real time Doppler velocity de-aliasing primarily operates between the CPU-1 140, and the Global Memory 144. The pulse repetition frequency (PRF) selection for a Dual Scan generated in CPU-1 is outputted via the System Controller 148 to the Controller Bus 152 and then to the SCSI Controller 154. The Interface Controller sends the PRF selection information to the Digital Signal Processor 42 over the Interface Bus 158. The de-aliased Doppler velocity data is passed on to weather detection programs which transfer weather data from Global Memory 144 via the System Bus 146 to the System Controller 148; the data is then transferred from the System Controller 148 via Controller Bus 152 to the Communication Controller 156 which is coupled directly to the User Display 46.

Figure 3:
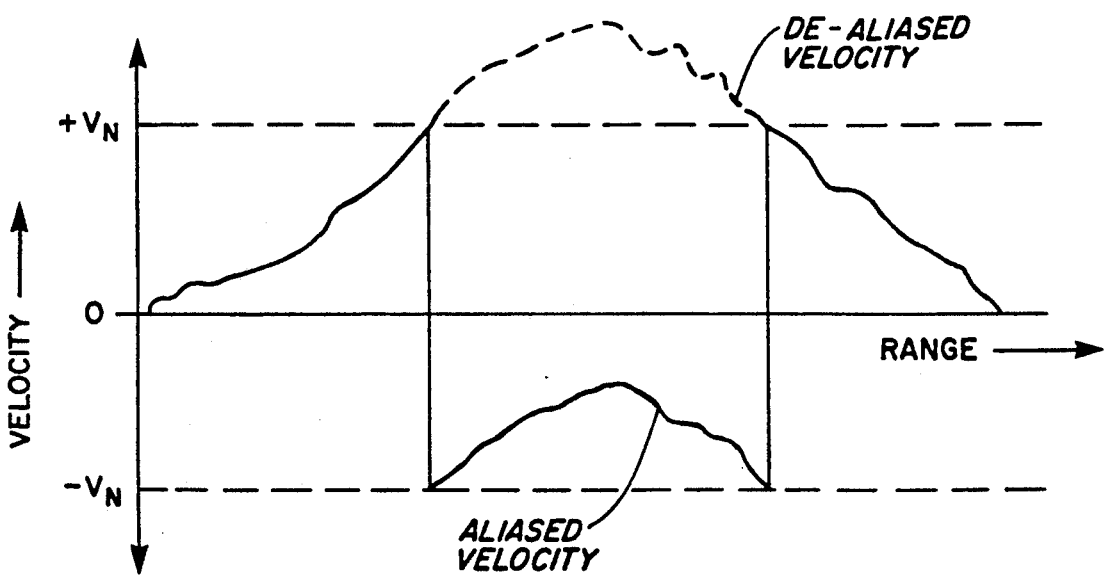
FIG. 3 is a diagram showing ambiguous, aliased velocity input data and the de-aliased velocity output data resulting from the invention.

Referring now to FIG. 3, a graphic example of ambiguous, folded or aliased velocity data is shown. Velocity is plotted as a function of range. When the velocity reaches a Nyquist velocity (VN) the data "foldsover" to a negative value or aliased value. The present invention de-aliases or unfolds in real time of the operational radar system the velocity data resulting in the de-aliased velocity data illustrated by the dotted section of the plot in FIG. 3. Aliasing of the velocity data occurs because the radar sampling rate is optimized (compromised) for both range and velocity ambiguity resolution. As a result, it does not meet the Nyquist sampling criteria for observing all the velocities of interest and results in ambiguous (aliased) data which must be unfolded to remove discontinuities which cause false alarms in pattern recognition programs.

Referring now to FIG. 1, a basic method of real time velocity de-aliasing comprises a Process Radials 20 routine which processes every valid range gate along a radar dwell by determining if it is within the Nyquist velocity (VN) of the average of four preceding range samples (VA) or in the case of noncontinuous missing data, using data from a Windfield Model; a Windfield Model is a representation of the radial component of the current wind. If a range gate's velocity value is more than VN from its neighbor's value, then two times VN is either added to or subtracted from the current velocity to unfold the aliased velocity. This process can be repeated to account for multiple folds.

The measured velocity at range gate n, i.e., $V_n$, is related to the true velocity $VT_n$ by:

$$VT_n = V_n \pm 2I \, (VN)$$

where the integer I represents the number of Nyquist intervals by which the true velocity ($VT_n$) deviates from the measured value, and VN is the Nyquist velocity. The unfolded true velocity $V_{Tn}$ is then subtracted from to the average unfolded velocity, VA, of the four preceding gates and checked to determine if it is within an adaptable fraction (nominally 0.5) of the Nyquist velocity, VN as follows:

$$|VA - VT_n| < 0.5 \, (VN)$$

This test represents a Windfield Model quality check. Because of the dependence of de-aliasing on the Windfield Model, it is desirable to eliminate spurious data from the model. If the above quality check is satisfied, then $VT_n$ is used in computing VA and in the Windfield Model velocity, VW. If the quality check is not met, then the trend in the velocities $TV = V_{(n-1)} - V_{(n-4)}$ is compared to the trend of the average $TA = V_n - VA$. This trend is set to zero if the magnitude of the change is less than an adaptable threshold (nominally 2 m/s). The trend information is of use only when there is a strong velocity gradient. If the trends are of opposite sign, or zero, $VT_n$ is used in computing VA, but is not used in the computation of the Windfield Model velocity (VW). If the trends are of the same sign, then $VT_n$ is used in computing VA and in VW. This processing aids in unfolding small perturbations in the velocity estimate associated with the Windfield Model.

Referring again to FIG. 1, the complete processing operation for performing the enhanced method of real time velocity de-aliasing are shown. Radial base data is received from the DSP 42. A decision regarding Dual Scan 12 is made wherein if the data is from dual scans, the first processing routine is the Process Dual Scans (PDS) 16 routine shown in FIG. 4 which receives and stores the PRF value and velocity information from the first of the dual scans. A second PRF value, that is chosen to yield the best de-aliasing performance, is determined by the PDS routine 16 to be used on a second scan and such second PRF value is sent to the DSP 42 which generates control information for the Transmitter 38. The PRF for the second scan is chosen relative to the first to yield the best de-aliasing performance. This PRF is chosen such that differences in the velocity data from each range gate will not be "masked" by statistical uncertainties in the data or the movement of weather targets. The weather radars are typically capable of using many different PRF's in an operational mode. The PRF pairs can be chosen to yield optimum performance prior to real time application. As the second low-level scan is processed, the PDS 16 routine de-aliases the velocity by determining the unambiguous velocity by using the data collected from two PRFs. It should be noted that this technique is not restricted to low scans and that any dual scan can be processed in this manner. Referring again to FIG. 1, at the end of the second dual elevation scan or if there was no dual scan, a check for Initialized Windfield Model Flag Bit 17 is performed. If the Windfield Model has not been initialized, then Initialize Windfield Model 18 is performed whereby current weather data is put into this model. Following this operation the de-aliasing method proceeds to a Process Radials (PR) 20 routine. During the subsequent non-dual scans of the radar the Process Radials 20 routine is the first to process the data on a range gate by range gate basis. The Processing Radials 20 routine examines the data for continuity, and de-aliases the data based on either the average of the previous range gates, or the Windfield Model. It then passes the de-aliased range gate data on to the Minimize Azimuthal Shear (MAS) 22 routine which checks for discontinuities from azimuth-to-azimuth. A minimize azimuthal shear technique is implemented to help eliminate ambiguities when the shear exceeds VN from gate-to-gate. Such a technique is necessary because the basic de-aliasing method assumes that no true velocity is more than VN from the previous range gate. The shear minimization check ensures that the values of azimuthally adjacent range gates are within an adaptable threshold (nominally 0.5 VN) of one another. As each range gate is being de-aliased the method checks for changes in velocity greater than 0.5 VN in the radial dimension. When a large change is identified, the velocity for that gate and it's azimuthally neighboring gate are compared. If the velocities are within an adaptable threshold (nominally 0.5 VN), the process continues with the next range gate. If the velocity's difference exceeds this threshold, the azimuthal differences between the current storage gate and the nine succeeding gates are summed. If this sum is greater than an adaptable threshold, then the current range gate is de-aliased relative to the azimuthal neighbor. This technique is applied over small ranges so that relatively small naturally occurring azimuthal shears, such as tornadoes, are not de-aliased incorrectly and eliminated. Diagnostic messages are generated when the gate-to-gate and azimuth-to-azimuth velocity differences result in conflicting reports on the Nyquist interval. The data is then passed on to the Update Windfield Model (WFM) 24 routine where the data is subjected to further quality checks and then incorporated into the Windfield Model that is used for subsequent scans.

Since weather can be discontinuous in space, this de-aliasing method processes data using different logic paths depending on the degree of continuity. Areas of continuous data consist of valid data with breaks of no more than two out of four range gates. For valid data, the method processes data radially using the average of the last four range gates to unfold the data. The method uses the Windfield Model value if more than two of the last four data points are flagged as invalid. The Windfield Model is comprised of sectors. Each of these sectors has a finite azimuthal extent and a radial extent which is dependent on elevation angle. The Windfield Model is initialized, sector by sector, from the dual scan de-aliased velocities. This initialization value is used until the Windfield Model updating process updates each individual sector. The Update WFM 24 routine checks for aliased Windfield Model sectors, smooths and interpolates the Windfield Model to blank sectors to account for weather target movement. The output De-aliased Velocities Data 28 is then passed to the other weather detection algorithms which are heavily dependent on the velocity base data being correctly de-aliased. Many of the weather detection programs identify velocity changes on an azimuth-to-azimuth or a range gate-to-gate basis. Aliased velocity data results in artificial velocity differences that result in false alarms. After the data has been formed into user products, they are sent to the User Display 46 for interpretation. The process shown in FIG. 1 is repeated for every radial of data.

Figure 4:
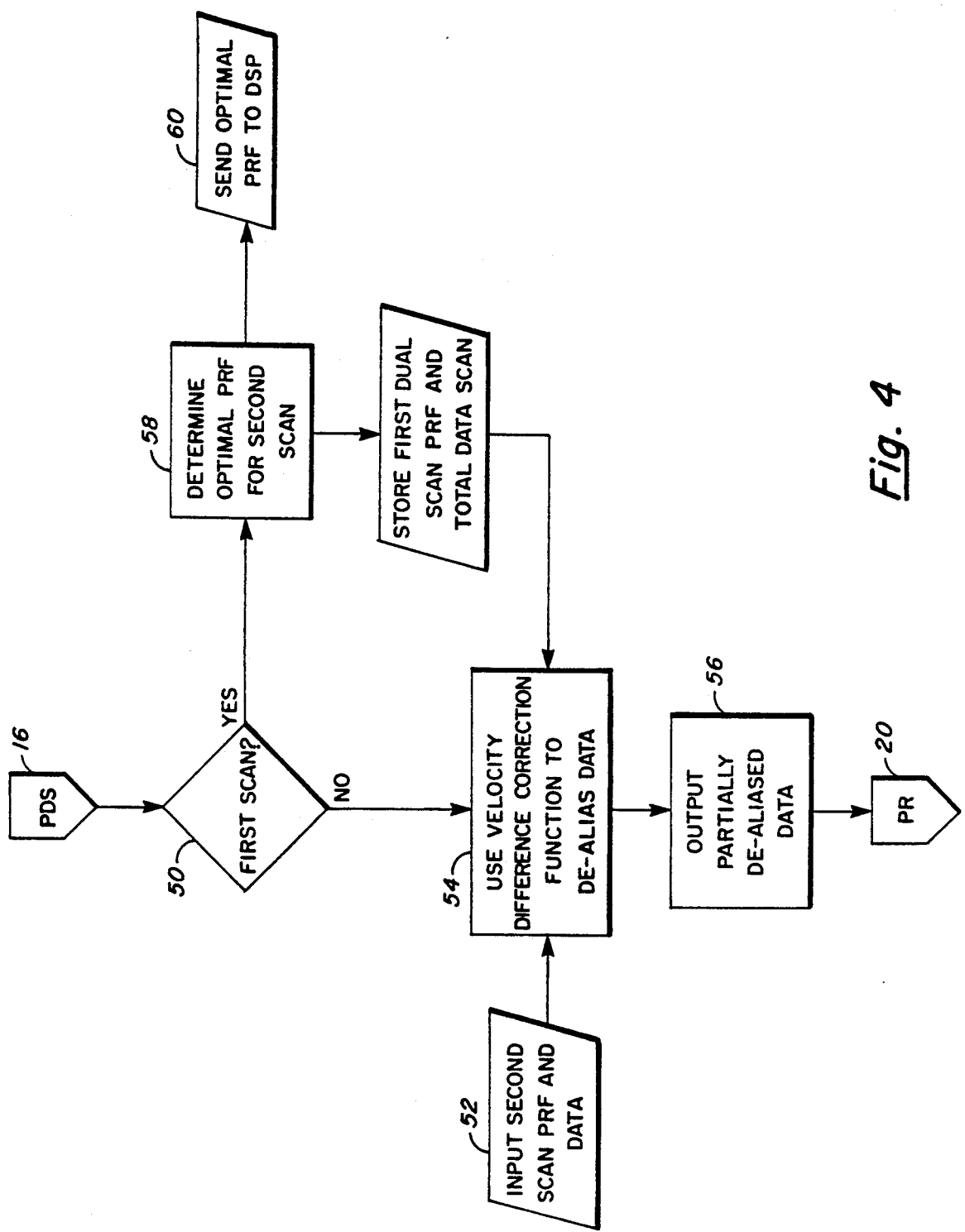
FIG. 4 is a flow chart of a Process Dual Scans routine shown in block form in FIG. 1.

Referring now to FIG. 1 and FIG. 4, FIG. 4 is a flow chart of the Process Dual Scans (PDS) 16 routine shown in block form in FIG. 1. The Weather Radar 30 scanning strategies employ two scans at the same elevation angle with different PRFs for de-aliasing purposes. The radial velocity data from the first scan is saved for comparison with the velocity data from the second scan. The velocity for the higher PRF is de-aliased by examining the difference in the velocities and adding the corresponding correction factor to the velocity of the scan having the higher PRF. The de-aliased data from PDS 16 is output to the PR 20 routine. Table 1 lists the inputs provided to the Processing Dual Scans 16 routine and Table 2 lists the outputs generated by such routine.

TABLE 1

| PROCESS DUAL SCANS INPUTS | |
| --- | --- |
| INPUTS | COMMENTS |
| Dwell data: | Dwell data consists of ancillary information about data base. |
| Current azimuth | |
| Current elevation | |
| Dwell ID | |
| Scan ID | |
| Clutter residue map number | |
| PRF | |

TABLE 1-continued
PROCESS DUAL SCANS INPUTS

| INPUTS | COMMENTS |
|---|---|
| Scan number | |
| Volume scan count | |
| Scan strategy | |
| End of elevation scan | |
| Angular scan rate | |
| Pulses per dwell | |
| Start of volume scan | |
| Start of elevation scan | |
| Solar indicator | |
| Range samples per dwell | |
| Final range sample | |
| End of volume scan | |
| First dual scan: | |
| Dwell data: | Dwell data consists of ancillary information about base data. |
| Current azimuth | |
| Current elevation | |
| Dwell ID | |
| Scan ID | |
| Clutter residue map number | |
| PRF | |
| Scan number | |
| Volume scan count | |
| Scan strategy | |
| End of elevation scan | |
| Angular scan rate | |
| Pulses per dwell | |
| Start of volume scan | |
| Start of elevation scan | |
| Solar indicator | |
| Range samples per dwell | |
| Final range sample | |
| End of volume scan | |
| Valid data flag | Dwell identifying information sample velocity data, Valid data flags, for the first scan of a dual scan. |
| Radial velocity | |
| Valid velocity flag | |
| Last dual PRFs and Nyquists: | |
| Last dual high PRF | The high and low PRFs and corresponding Nyquist velocities of dual scans. |
| Last dual low PRF | |
| Last dual high Nyquist | |
| Last dual low Nyquist | |
| Radar frequency | The radar frequency being transmitted. |
| Radial velocity | The radial velocity is the mean radial component of the scatterer velocities in the radar sample volume. |
| Valid data flag | Edited valid data flag merged with obscured range cells indicator. This flag exists for each sample volume. |
| Valid velocity flag | Indicator of the validity of the measured velocity before de-liasing by thresholding the signal-to-noise ratio. This flag exists for each sample volume. |

TABLE 2
PROCESS DUAL SCANS OUTPUTS

| OUTPUTS | COMMENTS |
|---|---|
| Dual radial velocity | Velocity of a higher of two PRFs of a dual low level scan which has been de-aliased relative to the lower PRF. |
| Dual scan valid data flag | Valid data flag after dual scan processing. |
| Dual scan valid velocity flag | Valid velocity flag after dual scan processing. |

TABLE 2-continued
PROCESS DUAL SCANS OUTPUTS

| OUTPUTS | COMMENTS |
|---|---|
| First dual scan: | |
| Dwell data | |
| Current azimuth | |
| Current elevation | |
| Dwell ID | |
| Scan ID | |
| Clutter residue map number | |
| PRF | |
| Scan number | |
| Volume scan count | |
| Scan strategy | |
| End of elevation scan | |
| Angular scan rate | |
| Pulses per dwell | |
| Start of volume scan | |
| Start of elevation scan | |
| Solar indicator | |
| Range samples per dwell | |
| Final range sample | |
| End of volume scan | |
| Valid data flag | Dwell identifying information: sample volume velocity data, Valid data flags, and Valid velocity flags for the first scan of a dual scan. |
| Radial velocity | |
| Valid velocity flag | |
| Last dual PRFs and Nyquists: | |
| Last dual high PRF | The high and low PRFs and corresponding Nyquist velocities of the process dual scans. |
| Last dual low PRF | |
| Last dual high Nyquist | |
| Last dual low Nyquist | |
| Nyquist velocity | Maximum unambiguous velocity for a PRF = PRF (lambda/4), where lambda is the wavelength of the radar. |

If it is a first scan, then the PDS 16 routine proceeds to Determine Optimal PRF for second Scan 58 and performs Send Optimal PRF To DSP 60 which forwards a signal to the Digital Signal Processor 42 for selecting the second scan PRF. Next, the routine proceeds to an operation of First Dual Scans PRF And Total Data Scan 62 which provides such data for the next operation of Use Velocity Difference Correction Function To De-alias Data 54. During such operation, Input Second Scan PRF And Data 52 is provided for processing. Following this de-alias data processing operation, the routine performs Output Partially De-aliased Data 56 which is provided to the Process Radials 20 routine.

Dual scans are performed at the same elevation angle but different PRFs. Since the two PRF scans have different unambiguous ranges, they are likely to have different sample volumes obscured by range ambiguous weather. Thus, they will have different sample volumes tagged as invalid. Prior to the de-aliasing process, non-weather targets are removed and flagged invalid. When a sample volume is checked for validity, both the valid data flag and the valid velocity flag are examined; if either is invalid, then the velocity for that sample volume and PRF is considered invalid. When only one valid velocity exists for a sample volume, the valid velocity is set as the dual radial velocity. If only the first dual scan's velocity is valid for a sample volume, then the velocity and valid velocity flag for the first scan replaces the velocity and valid velocity flag for the second scan. If both velocities are invalid, then processing continues with the next sample volume.

When the velocities for the two PRF scans are valid, the de-aliased velocity will be determined by comparing the differences between the aliased velocities of the higher and lower PRF scans with a list of the possible velocity differences. The velocity difference, V2−V1, is computed, where V1 is the measured velocity of the lower PRF and V2 is the measured velocity of the higher PRF.

Figure 8:
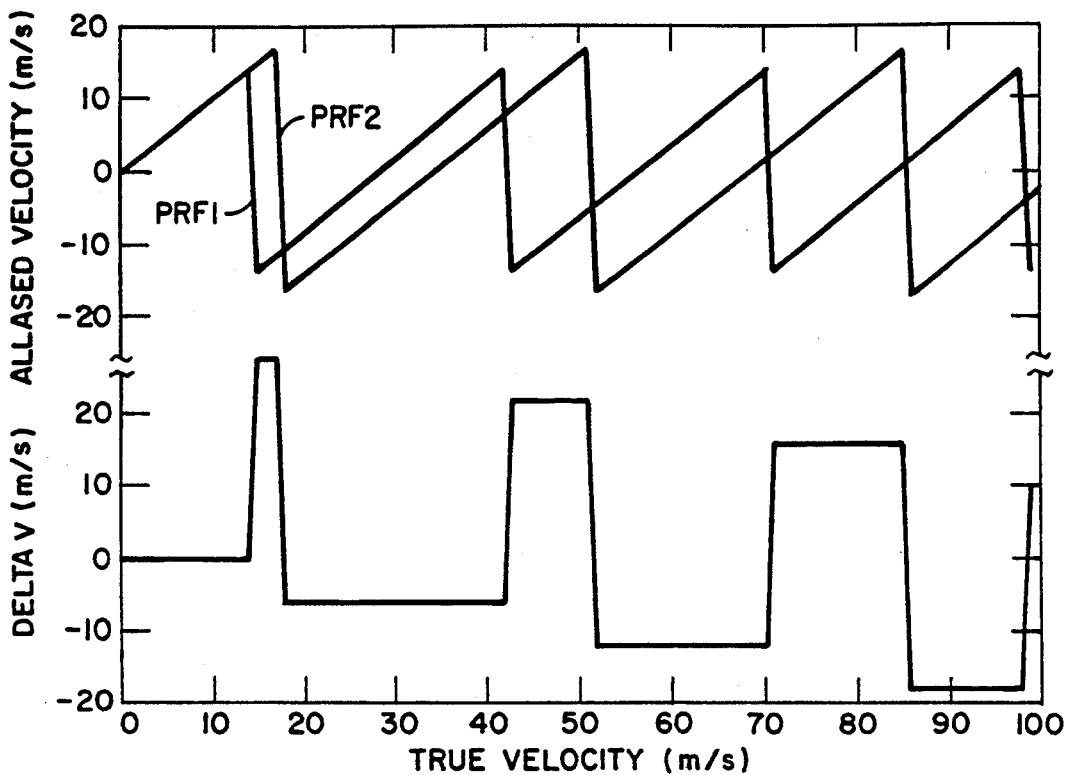
FIG. 8 is a graphical representation of aliased velocities and the velocity difference transfer function for typical dual scan PRF values.

In order to compute the velocity differences, the Nyquist velocities corresponding to the two PRFs are determined. If the PRF values for this sample volume are different from those of the previous dual scan sample volume processed or if no dual scan sample volume has yet been processed, new Nyquist velocities, VN1 and VN2, are computed as follows:

VN1=PRFlow (lambda/4)
VN2=PRFhigh (lambda/4)

where,

VN1=Nyquist velocity of the lower PRF
VN2=Nyquist velocity of the higher PRF
PRFlow=lower pulse repetition frequency
PRFhigh=higher pulse repetition frequency
lambda=Radar wavelength There are eleven possible aliased velocity differences (delta) which correspond to positive and negative true velocities in the range from −80 to +80 m/s. FIG. 8 shows a graphic representation of the velocity difference correction functions. These eleven deltas and the corresponding Nyquist corrections are computed as shown in Table 3. The routine finds the delta which is closest to the calculated value of the velocity difference and adds the corresponding correction factor to the higher PRF's velocity to compute the de-aliased velocity. If two deltas are equally close, the one with the smaller correction is used. The Nyquist velocity output must correspond to the dual radial velocity output. This routine generates the Output Partially De-aliased Data 56 as listed in Table 2.

Figure 5:
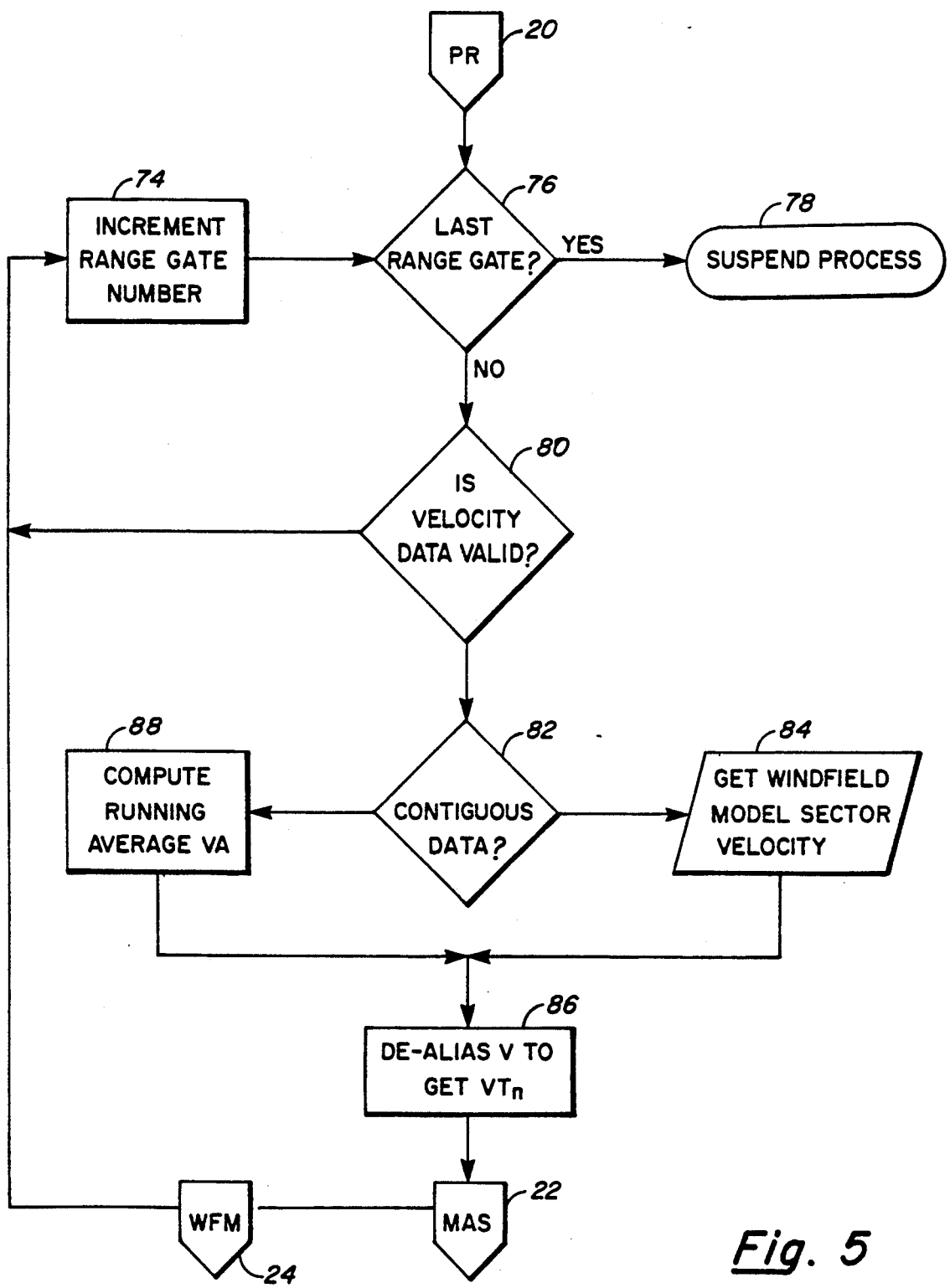
FIG. 5 is a flow chart of a Process Radials routine shown in block form in FIG. 1.

Referring now to FIG. 1 and FIG. 5, FIG. 5 is a flow chart of the Processing Radials 20 routine shown in block form in FIG. 1. Table 4 lists the inputs provided to the Process Radials 20 routine and Table 5 lists the outputs generated by such routine. With this routine velocity data is de-aliased radially sample volume by sample volume. The average of the last four sample volumes is used as the de-aliasing reference. In the case where more than two of the last four data are invalid, the corresponding value of the Windfield Model 24 is used as the de-aliasing reference.

TABLE 3
ALIASED VELOCITY DIFFERENCES WITH NYQUIST CORRECTIONS

| DELTAS | NYQUIST CORRECTIONS |
| --- | --- |
| delta (1) = −2 VN 1 + 4 (VN 2 − VN 1) | corr (1) = −4 VN 2 |
| delta (2) = 4 (VN 2 − VN 1) | corr (2) = −4 VN 2 |
| delta (3) = −2 VN 1 + 2 (VN 2 − VN 1) | corr (3) = −2 VN 2 |
| delta (4) = 2 (VN 2 − VN 1) | corr (4) = −2 VN 2 |
| delta (5) = −2 VN 1 | corr (5) = 0 |
| delta (6) = 0 | corr (6) = 0 |
| delta (7) = 2 VN 1 | corr (7) = 0 |
| delta (8) = −2 (VN 2 − VN 1) | corr (8) = 2 VN 2 |
| delta (9) = 2 VN 1 − 2 (VN 2 − VN 1) | corr (9) = 2 VN 2 |
| delta (10) = −4 (VN 2 − VN 1) | corr (10) = 4 VN 2 |
| delta (11) = 2 VN 1 − 4 (VN 2 − VN 1) | corr (11) = 4 VN 2 | where:
VN 1 = Nyquist velocity of the lower PRF
VN 2 = Nyquist velocity of the higher PRF
delta (1) ... delta (11) = eleven possible velocity differences
corr (1) ... corr (11) = corresponding eleven Nyquist corrections

TABLE 4
PROCESS RADIALS INPUTS

| INPUTS | COMMENTS |
| --- | --- |
| Dual radial velocity | Velocity of the higher of two PRFs of a dual low level scan which has been de-aliased relative to the lower PRF. |
| Dual scan valid data flag | Valid data flag after dual scan processing. |
| Dual scan valid velocity flag | Valid velocity flag after dual scan processing. |
| Last PRF and Nyquist | PRF and Nyquist velocity of last sample volume processed. |
| Nyquist velocity | Maximum unamtiguous velocity for a PRF = PRF (lambda / 4) where lambda is the wavelength of the radar. |
| PRF | The Pulse Repetition Frequency (PRF), specifies the number of pulse transmissions per seconds. The value of PRF will be one of the 23 predefined constants. |
| Previous velocity | The dealiased velocities of the four previous sample volumes. |
| Radar frequency | The radar frequency being transmitted. |
| Radial velocity | The radial velocity is the mean radial component of the scatterer velocities in the radar sample volume after point targets have been removed. |
| Scan ID | Identifies the purposes of the current scan. |
| Thres jump | PSF adaptable value indicating the maximum number of Nyquist intervals allowable between the measured and de-aliased velocities of a sample volume before an algroithm failure is identified. |
| Valid data flag | Edited valid data flag merged with obscured range cells indicator. This flag exists for each sample. |
| Valid velocity flag | Indicator of the validity of the measured velocity before de-aliasing by thresholding the signal-to-noise ratio. This flag exists for each sample volume. |
| Windfield Model: | Two-dimensional model of each elevation of a scan |

TABLE 4-continued
PROCESS RADIALS INPUTS

| INPUTS | COMMENTS |
| --- | --- |
| Current elevation | strategy of the current |
| Current azimuth | volume scan. Each eleva- |
| Windfield Model last | tion consists of sectors |
| update time | with azimuthal extent of |
| Beginning range extent | 15 degrees and range extent |
| Range extent length | dependent on the elevation |
| Sector velocity | angle (vertical distance |
| Sector diagnostic flag | of 750 m or horizontal |
| | distance of 5 km, whichever |
| | is smaller). Each sector |
| | contains a sector velocity |
| | computed from the average |
| | velocity of all those |
| | sample volumes located |
| | within the sector which |
| | have passed a quality |
| | check, if more than an |
| | adaptable percentage passed |
| | the check, or the velocity |
| | of the next lower elevation |
| | angle's sector. |

TABLE 5
PROCESS RADIALS OUTPUTS

| OUTPUTS | COMMENTS |
| --- | --- |
| Average velocity | Average velocity of the four previous sample volumes. |
| Conditioned valid data flag | Valid data flag after editing and dual scan processing. This exists for each sample volume. |
| Conditioned valid velocity flag | Valid velocity flag after editing and dual scan processing. This flag exists for each sample volume. |
| Delta VR | Difference between the current de-aliased radial velocity and the average velocity of the four previous sample volumes. |
| Initial de-aliasing algorithm failure flag | Flag to indicate whether the de-aliasing algorithm worked without apparent diffuculty after Process radials or whether a radial velocity discontinuity exceeded a PSF adaptable number of Nyquist multiples. |
| Last PRF and Nyquist | PRF and Nyquist velocity of last sample volume processed. |
| Nyquist velocity | Maximum unambiguous velocity for PRF = PRF (lambda/4) where lambda is the wavelength of the radar. |
| Previous velocity | The de-aliased velocities of the four previous sample volumes. |
| Radially de-aliased radial veolcity | Radial velocity after having been de-aliased with respect to previous four samples. |

Then each sample volume is de-aliased with respect to its azimuthal neighbor if radial and azimuthal velocity differences exceed threshold values. Following the PR 20 routine, the de-aliasing method proceeds to a Minimize Azimuthal Shear 22 routine followed by the Update Windfield Model 24 routine. Each sector of the Windfield Model is updated with the average radial velocity for the sector if the velocity data is of sufficient quality. The Windfield Model 24 which is described hereinafter is initialized upon startup as shown in FIG. 1 or if the time from last update exceeds a threshold called Windfield Model expiration time. Upon change of scan strategies from a monitor to a hazardous mode or hazardous mode to monitor mode, a new Windfield Model is interpolated to elevation angles not present in the old scan strategy.

Still referring to FIG. 5, the Process Radials 20 routine starts by entering a Last Range Gate 76 check. If it is the last range gate, then Suspend Process 78 occurs and the program waits for the receipt of new data. If it is not the last range gate, then the routine performs Is Velocity Data Valid 80 check. A sample volume is valid when both a Valid Data Flag Input and the Valid Velocity Flag Input are valid. If the velocity data is invalid, then the routine proceeds to the Increment Range Gate Number 74 operation and processes the next sample volume. If the velocity data is valid, then the routine proceeds to a Contiguous Data? 82 check. If there is contiguous data, which is defined as at least two of the last four range gates being valid, then Compute Running Average VA 88 is performed. Processing then continues to De-alias V to GET $VT_n$ 86 which determines if the de-aliasing reference (VA) is within the Nyquist velocity, VN, of the velocity for the current sample volume. If VA is within VN of the current velocity, the current velocity is used in the next average computation. The following equation shows the relationship between the de-aliased and measured velocity values:

$$VT_n = V_n + 2I(VN) SGN(VA - V_n)$$

where:
$VT_n$ = de-aliased velocity
$V_n$ = measured velocity at sample volume n
I = number of Nyquist intervals by which the true velocity deviates from the measured value
VN = Nyquist velocity
SGN = signum function which returns the sign of its argument.

The difference, $VA - V_n$, is the difference between the average of the velocities of the four previous sample volumes, VA, and the velocity of the current sample volume, $V_n$. If this difference is greater than VN, the Nyquist velocity, then two times VN is repeatedly added to the current velocity until the magnitude of the velocity difference is less than or equal to VN. If the difference between the current velocity and the average, $V_n - VA$, is greater than VN, then two times VN is repeatedly subtracted from the current velocity until the magnitude of the velocity difference is less than or equal to VN. When de-aliasing takes place, the measured velocity is set equal to the de-aliased velocity in further computations involving this sample volume velocity. The difference, DeltaVR, between the de-aliased velocity $VT_n$ and the average velocity is saved while the radial of the sample volume is the current radial being processed or the previous radial processed. Failures are uniquely identified, if I at sample volume n exceeds an adaptable value, threshold.

When the Contiguous Data 82? check indicates that more than two of the at least four sample volumes are invalid, the routine proceeds to a Get Windfield Model Sector Velocity 84 operation and then performs the De-alias V To Get $VT_n$ 86 operation. This process de-aliases the first four sample volumes of each radial with respect to the Windfield Model, using the Windfield Model value for that sector as VA for a de-aliasing reference. Following the velocity de-aliasing, the routine proceeds to perform a Minimize Azimuthal Shear 22 routine followed by the Update Windfield Model 24 routine, and then the routine performs Increment Range Gate Number 74 which increments a counter followed by the Last Range Gate 76 check.

Figure 6:
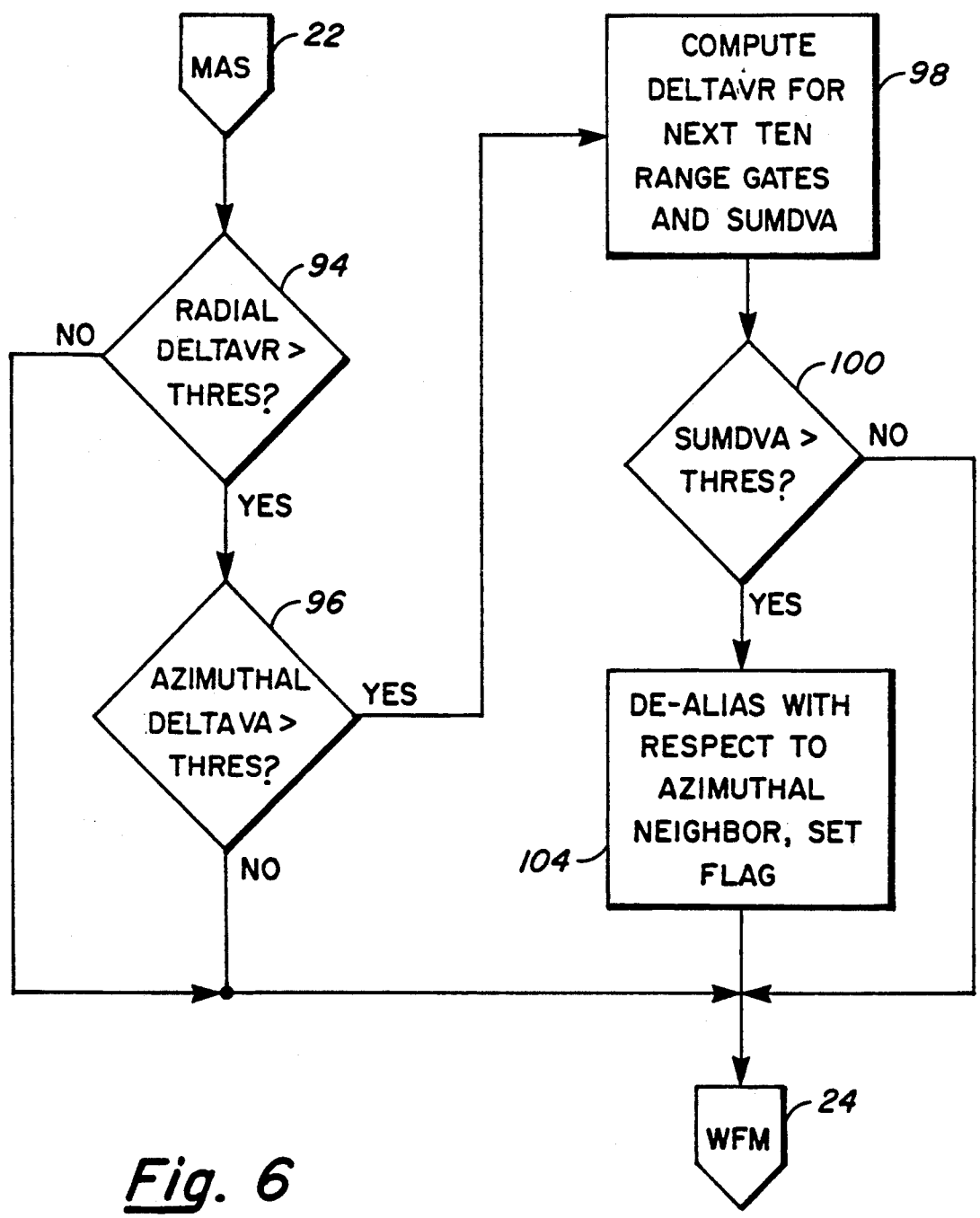
FIG. 6 is a flow chart of a Minimize Azimuthal Shear routine shown in block form in FIG. 1.

Referring now to FIG. 1 and FIG. 6, FIG. 6 is a flow chart of the Minimize Azimuthal Shear (MAS) 22 routine shown in block form in FIG. 1. The MAS 22 routine checks for discontinuities from azimuth-to-azimuth and eliminates ambiguities when the shear exceeds VN from gate-to-gate. When the current elevation of the current sample volume does not equal that of the previous sample value, then this indicates the first radial of a new elevation scan. Since the present de-aliasing method requires two radials for processing, no Minimize Azimuthal Shear is done for the first radial of a scan. For all other radials Minimize Azimuthal Shear 22 Routine is performed for all valid sample values. Table 6 lists all the inputs provided to the MAS 22 routine and Table 7 lists all of the outputs generated by such routine.

Still referring to FIG. 6, the Minimize Azimuthal Shear (MAS) 22 routine first performs a Radial DeltaVR>Thres 94 check where the routine compares DeltaVR with the threshold, defined as some fraction of the Nyquist velocity (normally 0.5 VN) where DeltaVR is the difference between the de-aliased velocity of sample volume n and the average of its four previous samples along the same radial (computed by the de-aliasing Process Radials 20 routine).

TABLE 6

| MINIMIZE AZIMUTHAL SHEAR INPUTS | |
|---|---|
| INPUTS | COMMENTS |
| Conditioned valid data flag | Valid data flag after editing and dual scan processing. This flag exists for each sample volume. |
| Conditioned valid velocity flag | Valid velocity flag after editing and dual scan processing. This flag exists for each sample volume. |
| Current elevation | Specifies the elevation angle of the current dwell. |
| DeltaVR | Difference between the current de-aliased radial velocity and the average velocity of the four previous sample volumes. |
| Initial de-aliasing algorithm failure flag | Flag to indicate whether the de-aliasing algorithm worked without apparent diffuculty after Process radials or whether a radial velocity discontinuity exceeded a PSF adaptable number of Nyquist multiples. |
| Last current elevation | Current elevation of last radial processed. |
| Nyquist velocity | Maximum unambiguous velocity for a PRF = PRF (lambda/4), where lambda is the wavelength of the radar. |
| Previous radial: | Radial indentification information for all sample volumes of the previous radial processed. |
| Dwell data: | |
| Current azimuth | |
| Current elevation | |
| Dwell ID | |
| Scan ID | |
| Clutter residue map number | |
| PRF | |
| Scan number | |
| Volume scan count | |
| Scan strategy | |
| End of elevation scan | |
| Angular scan rate | |
| Pulses per dwell | |
| Start of volume scan | |
| Start of elevation scan | |
| Solar indicator | |

TABLE 6-continued

| MINIMIZE AZIMUTHAL SHEAR INPUTS | |
|---|---|
| INPUTS | COMMENTS |
| Range samples per dwell | |
| Final range sample | |
| End of volume scan | |
| Radial velocity | |
| Valid velocity flag | |
| Radially de-aliased radial velocity | Radial velocity after having been de-aliased. |
| Thresaz ny | PSF adaptable parameter, a percentage to be multiplied by the Nyquist velocity. The product is used as a threshold for the allowable difference between the dealiased velocity of a sample volume and that of its azimuthal neighbor to determine if additional testing for azimuthal de-aliasing must take place. It is also used with the sum of the azimuthal velocity differences of the ten succeeding sample volumes to determine whether the velocity will be dealiased azimuthally. |
| Thresr ny | PSF adaptable parameter, a percentage to be multiplied by the Nyquist velocity. The product is used as a threshold for the allowable difference between the de-aliased velocity of a sample volume and the average of the velocities of the four previous sample volumes, to determine if additional testing for azimuthal de-aliasing must take place. |

TABLE 7

| MINIMIZE AZIMUTHAL SHEAR OUTPUTS | |
|---|---|
| OUTPUTS | COMMENTS |
| De-aliased radial velocity | The de-aliased radial velocity is the radial velocity after both radial and azimuthal de-aliasing have taken place. |
| De-aliasing algorithm failure flag | Flag to indicate whether the de-aliasing algorithm worked without apparent difficulty, whether a radial velocity discontinuity exceeded a PSF adaptable number of Nycuist multiples, and/or whether the sum of velocity differences between azimuthally-adjacent sample volumes exceeded a PSF adaptable percentage times the Nyquist velocity. This flag exists for each sample volume. |
| Last current elevation | Current elevation of last radial processed. |
| Previous radial: | Radial indentification information and radial velocities for all sample volumes of the previous radial processed. |
| Dwell data: | |
| Current azimuth | |
| Current elevation | |
| Dwell ID | |
| Scan ID | |
| Clutter residue map number | |
| PRF | |
| Scan number | |
| Volume scan count | |
| Scan strategy | |

TABLE 7-continued
MINIMIZE AZIMUTHAL SHEAR OUTPUTS

| OUTPUTS | COMMENTS |
|---|---|
| End of elevation scan | |
| Angular scan rate | |
| Pulses per dwell | |
| Start of volume scan | |
| Start of elevation scan | |
| Solar indicator | |
| Range samples per dwell | |
| Final range sample | |
| End of volume scan | |
| Radial velocity | |
| Valid velocity flag | |

The product is used as a threshold for the allowable difference between the de-aliased velocity of a sample volume and the average of the velocities of the four previous sample volumes, to determine if additional testing for azimuthal de-aliasing must take place. If DeltaVR is equal to or less than the threshold, then the routine proceeds to the Windfield Model 24 routine. If Delta VR is greater than the threshold, then the MAS 22 routine proceeds to check for Azimuth DeltaVA>Thres? 96. The azimuthal velocity difference (DeltaVA) is computed as follows:

$$DeltaVA = ABS\ [V_{n,a} - V_{n,a-1}]$$

where, $V_{n,a}$ = velocity of the current sample volume $V_{n,a-1}$ = velocity of its azimuthal neighbor on the preceding radial processed DeltaVA = azimuthal velocity difference between the radial components of $V_{n,a}$ and its azimuthal neighbor, and ABS = the absolute value function.

If DeltaVA is less than a threshold, adaptable parameter, "Thresaz ny," nominally 0.5 times the Nyquist velocity, azimuthal processing continues with the next sample volume. If DeltaVA is greater than or equal to "Thresaz ny," then the azimuthal velocity differences between the current sample volume and its nine succeeding radial sample volumes, if valid, and their azimuthal neighbor's value, if valid, of the previous radial processed, are summed to obtain SUMDVA. The MAS 22 routine proceeds to perform the operation Compute DeltaVR For Next Ten Range Gates And SUMDVA 98 and then performs check for SUMDVA>Threshold (Thres)? 100. If fewer than nine sample volumes remain on the radial, and DeltaVA is greater than or equal to "Thresaz ny," then the azimuthal velocity differences between the current sample volume and the remaining succeeding radial sample volumes, if valid, and their azimuthal neighbor's value, if valid, are summed, to obtain SUMDVA. In either case, SUMDVA is compared to a threshold Tdva where:

Tdva = (Thresaz ny) N(VN)

N = number of sample volumes in the sum

VN = the Nyquist velocity.

If SUMDVA is greater than the threshold, Tdva, then the routine proceeds to perform De-alias With Respect To Azimuthal Neighbor, Set Flag 104 where $V_{n,a}$ is de-aliased with respect to $V_{n,a-1}$. If the difference, $V_{n,a-1} - V_{n,a}$, is greater than VN, then two times VN is repeatedly added to $V_{n,a}$ until the magnitude of the velocity difference is less than or equal to VN, the Nyquist velocity. If the difference, $V_{n,a} - V_{n,a-1}$, is greater than VN, then two times VN is repeatedly subtracted from the current velocity until the magnitude of the velocity difference is less than or equal to VN. This de-aliasing equation is as follows:

$$VT_{n,a} = V_{n,a} + 2I(VN)SGN\ (V_{n,a-1} - V_{n,a})$$

where, $VT_{n,a}$ = velocity of the current sample volume de-aliased with respect to $V_{n,a-1}$ $V_{n,a}$ = velocity of the current sample volume I = the number of Nyquist intervals by which the velocity, $V_{n,a}$, deviates from the velocity $V_{n,a-1}$ VN = Nyquist velocity SGN = signum function which returns the sign of its argument, and $V_{n,a-1}$ = the velocity of the azimuthal neighbor of the current sample volume.

If SUMDVA is equal to or less than the azimuthal threshold product (Tdva), the MAS 22 routine proceeds to the Update Windfield Model 24 routine.

Figure 7:
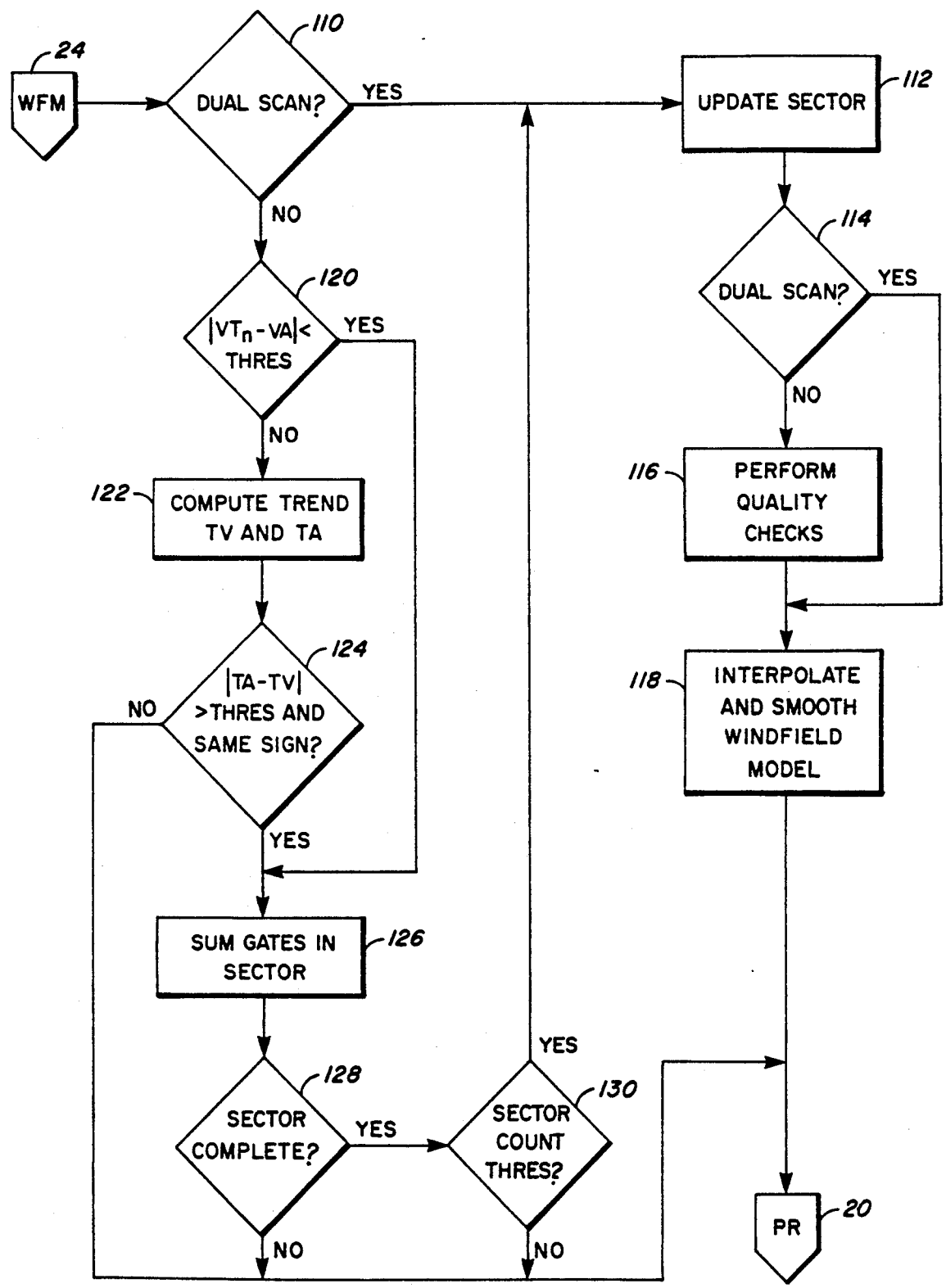
FIG. 7 is a flow chart of a Windfield Model routine shown in block form in FIG. 1.

Referring now to FIG. 1 and FIG. 7, FIG. 7 is a flow chart of the Update Windfield Model 24 routine shown in block form in FIG. 1. The Windfield Model for an elevation is comprised of mean, de-aliased, radial velocity sectors, each of which has a finite azimuthal extent of 15 degrees and a radial extent which is dependent on the elevation angle. The sector extent is constrained to a maximum horizontal component of 5.0 km and a maximum vertical component of 0.75 km. This two-dimensional sector representation exists for each elevation angle. Each sector contains a sector velocity computed from the average velocity of all those sample volumes located within the sector which have passed a quality check. Such velocities are used to update the Windfield Model sectors. The Windfield Model is initialized during a first volume scan following startup as shown in FIG. 1, or whenever the time since the Windfield Model was last updated exceeds Windfield Model expiration time. An initialization flag is set for the entire first volume scan. Before each sector is processed, if the initialization flag is set, the average velocity for the current sector is copied from the same azimuthal sector of next lower elevation.

Still referring to FIG. 7, Table 8 lists the inputs provided to the Update Windfield Model 24 routine and Table 9 lists the outputs generated by such routine.

TABLE 8
UPDATE WINDFIELD MODEL INPUTS

| INPUTS | COMMENTS |
|---|---|
| Average velocity | Average velocity of the four previous sample volumes. |
| Current azimuth | Specifies the azimuth of the current dwell. Measured clockwise with respect to true North. |
| De-aliased radial velocity | The de-aliased radial velocity is the radial velocity after both radial and azimuthal de-aliasing have taken place. |
| End of elevation scan | An indication that the end of the current elevation scan has been reached. |
| Initialize Windfield Model flag | Indicator for first volume scan after startup, or a Windfield expiration time has been exceeded. |
| Last scan strategy | Number of the previous scan strategy. |
| Nyquist velocity | Maximum unambiguous velocity for a PRF = PRF (lambda/4), |

TABLE 8-continued
UPDATE WINDFIELD MODEL INPUTS

| INPUTS | COMMENTS |
|---|---|
|  | where lambda is the wavelength of the radar. |
| Old Windfield Model: |  |
| Current elevation |  |
| Current azimuth |  |
| Beginning range extent |  |
| Range extent length |  |
| Sector velocity |  |
| Previous velocity | The de-aliased velocity of one of the four previous sample volumes. |
| Scan number | Each scan strategy is broken down into inividual scans which are numbered from beginning to end. The Scan number identifies the individual scan of the scan strategy used to acquire the current moment data. |
| Scan strategy | This entity identifies the current scan strategy type. |
| Validity percentage | PSF adaptable percentage of velocity lies in a sector of the Windfield Model which must be valid and have passed the quality check in order for the sector to be updated. |
| Velocity de-aliasing quality check threshold | Percentage of the Nyquist velocity with which the magnitude of the difference between the current sample's velocity and the average of the four previous velocities will be compared to in a Quality Check. |
| Velocity de-aliasing trend difference threshold | Threshold of the magnitude of the difference between the absolute value of the trend of the velo city change and the trend of the average of the previous four velocity changes. |
| Sector diagnostic flag |  |
| Windfield Model: | Two-dimensional model of each elevation of a scan strategy of the previous volume scan. |
| Current elevation |  |
| Current azimuth |  |
| Windfield Model last update time |  |
| Beginning range extent |  |
| Range extent length |  |
| Sector velocity |  |
| Sector diagnostic flag |  |
| Windfield Model expiration time | This is an adaptable time period used to validate the wind field model. If the model has not been updated for this amount of time, it will be reinitialized. |
| Windfield Model sector count | Count of the number of radial velocities which have been accepted for computing the sector velocity for a particular sector of the Windfield Model. |
| Windfield Model sector sum | Sum of all radial velocities which have been accepted for computing the sector velocity for a particular sector of the Windfield Model. |

TABLE 9
UPDATE WINDFIELD MODEL OUTPUTS

| OUTPUTS | COMMENTS |
|---|---|
| Initialize Windfield Model | Indicator for first volume scan after startup or after the expiration time which indicates that initialization must take place. |
| Last scan strategy | Number of the previous scan strategy. |
| Old Windfield Model: | Two-dimensional model of each elevation of a scan strategy of the previous volume scan. |
| Current elevation |  |
| Current azimuth |  |
| Beginning range extent |  |
| Range extent length |  |
| Sector velocity |  |
| Previous velocity | The dealiased velocity of one of the four previous sample volumes. |
| Scan number | Each scan strategy is broken down into individual scans which are numbered from beginning to end. The scan number identifies the individual scan of the scan strategy used to acquire the current moment data. |
| Updated sectors | Indicators of whether sectors have been updated due to sufficient valid velocities. |
| Volume scan count | This value indicates the sequence number of the current volume scan. |
| Windfield Model: | Two-dimensional model of each elevation of a scan strategy of the current volume. |
| Current elevation |  |
| Current azimuth |  |
| Windfield Model last update time |  |
| Beginning range extent |  |
| Range extent length |  |
| Sector velocity |  |
| Sector diagnostic flag |  |
| Windfield Model sector count | Count of the number of radial velocities which have been accepted for computing the sector velocity for a particular sector of the windfield model. |
| Windfield Model sector sum | Sum of all radial velocities which have been accepted for computing the sector velocity for a particular sector of the windfield model. |

The Update Windfield Model 24 routine first checks for a Dual Scan 110. If there is no dual scan the routine proceeds to perform a $|VT_n - VA| < THRES$ 120 check. The difference between the de-aliased velocity of the current sample volume ($VT_n$) and the average of the velocities (VA) of the four preceding sample volumes, i.e., $|VT_n - VA|$ is computed as follows:

$$TA = VT_n - VA$$

where,
TA = trend of the average
$VT_n$ = de-aliased velocity of the current sample volume
VA = average of the velocities.

The magnitude of $|TA| = |VT_n - VA|$ is compared with an adaptable percentage of the Nyquist velocity in a quality check. If the magnitude of the difference, $|TA|$, is less than the adaptable percentage of the Nyquist velocity, then the quality check is met and the routine proceeds to Sum Gates In Sector 126. The dealiased velocity $VT_n$ is added to the total of the velocity sum for the Windfield Model sector containing that sample volume and the sector count is incremented. If the quality check is not met, then the routine proceeds to Compute Trend TA and TV 122. The trend in the velocities, TV, is compared with the trend in the average, TA. The trend in the velocities is computed as follows:

$$TV = V_{(n-1)} - V_{(n-4)}$$

where, $V_{(n-1)}$ = velocity of the previous sample
$V_{(n-4)}$ = velocity of the last sample volume used in the average for this sample volume.

If the magnitude of the difference between $|TV|$ and $|TA|$ is greater than an adaptable threshold, and the trend of the average, TA, and the trend of the velocities, TV, are opposite sign, then $VT_n$ will not be used in computing the Windfield Model velocity. This $|TA-TV| > $ Thres 12 check eliminates small perturbations from being factored into the Windfield Model. The routine then proceeds to the Process Radials 20 routine. If the magnitude of the difference is greater than the adaptable threshold and the trends are of the same sign, the routine proceeds to perform Sum Gates In Sector 126 where $VT_n$ is added to the velocity sum for that sector and the sector count is incremented. This allows for large gradients to be factored into the Windfield Model 24. Next, a Sector Complete? 128 check is performed. If the sector is not completed, then the routine proceeds to the Process Radials 20 routine. If completed, then the routine proceeds to perform the Sector Count Thres? 130 check. If the number of sample volumes for the current sector that are valid and have passed the quality check is less than an adaptable percentage passed (Thres), then the routine proceeds to the Process Radials 20 routine. If the number of sample volumes for the current sector that are valid and have passed the quality check is greater than or equal to an adaptable percentage (Thres), then Windfield Model Update Sector 112 is performed. A Dual Scan? 114 check is performed, and if the data is from a dual scan, then the routine proceeds to perform the operation Interpolate and Smooth Windfield Model 118. For all but a dual scan, the routine first does a Perform Quality Checks 116 operation and then performs the Interpolate and Smooth Windfield Model 118 operation. Following this operation the routine proceeds to the Process Radials 20 routine. For a dual scan, the Perform Quality Checks 116 operation is by-passed so the routine proceeds directly to Interpolate and Smooth Windfield Model 118. The update sector occurs when the current sample volume is the last sample volume in the sector as defined by azimuth, radial extent, elevation angel, and direction of scanning. The de-aliased velocities for the sector are averaged to update the Windfield Model sector for the dual scan elevation angle. Then the routine proceeds to the Process Radials 20 routine.

The scan strategy is one of a set of strategies which enumerates each scan in that strategy and, when appropriate, its purpose, elevation angle, rotation rate, rotation time, elevation transit time. When a change in scan strategy from monitor to hazardous or from hazardous to monitor occurs, a new Windfield Model must be interpolated from the values of the existing Windfield Model. Sector velocities for elevation angles which occur for both Windfield Models are copied. Velocities for elevation angles which do not occur in the existing model will be interpolated from values for existing adjacent elevation angles.

The sector resolution of the Windfield Model is 15 degrees in azimuth. A variable slant range resolution, that is a function of the elevation angle, is as follows:

| Degrees Elevation | Resolution |
| --- | --- |
| 0.0 < el < = 8.6 | 4800 meters |
| 8.6 < el < = 17.4 | 2400 meters |
| 17.4 < el < = 38.6 | 1200 meters |
| 38.6 < el < = 60.0 | 600 meters |

When the new scan strategy values are to be interpolated between an elevation angle with a coarser resolution and an angle with a finer resolution, the sector velocities in the higher elevation sector corresponding to the lower elevation sector are averaged. This averaging is employed to establish a grid with the same resolution as the coarser lower elevation sector resolution. When interpolation takes place between two angles with the same resolution or after the sector velocities have been averaged, the sector velocity for the new elevation is linearly interpolated in elevation. For example, if the previous scan strategy had elevation angles of 9 and 7 degrees, and the current scan strategy has an elevation angle of 8 degrees, the interpolation would be between the two 2400 meter 9 degree sector values and the 4800 meters value from the 7 degree scan. In this example the weighting of the sector values is equal since they are both equidistant to the new (8 degree) angle.

The inputs required for performing the Interpolate and Smooth Windfield Model 118 are listed in Table 10 and the outputs are listed in Table 11. At the end of each elevation scan, the mean velocity for each Windfield Model sector that has been updated will be examined with respect to its azimuthal neighbor's value for sector aliasing. The velocity of each sector of a given radial extent will be compared with that of its azimuthal neighbor's value, and if the current sector's velocity is within the Nyquist velocity of its azimuthal neighbor's value, then no processing will occur.

TABLE 10

| SMOOTH WINDFIELD MODEL INPUTS | |
| --- | --- |
| INPUTS | COMMENTS |
| Current elevation | Specifies the elevation of the current dwell, with respect to a level platform |
| End of elevation scan | An indication that the end of the current elevation scan has been reached. |
| Nyquist velocity | Maximum unambiguous velocity for a PRF = PRF (lambda/4) where lambda is the wavelength of the radar. |
| Updated sector | Indicators of whether sectors have been updated due to sufficient valid velocities. |
| Windfield Model: | Two-dimensional model of each elevation of a scan strategy of the current volume scan. |
| Current elevation | |
| Current azimuth | |
| Windfield Model last update time | |
| Beginning range extent | |
| Range extent length | |
| Sector velocity | |
| Sector diagnostic flag | |

TABLE 11

SMOOTH WINDFIELD MODEL OUTPUTS

| OUTPUTS | COMMENTS |
|---|---|
| Windfield Model: | Two-dimensional model of each elevation of a scan strategy of the current volume scan. |
| Current elevation | |
| Current azimuth | |
| Windfield Model last update time | |
| Beginning range extent | |
| Range extent length | |
| Sector velocity | |
| Sector diagnostic flag | |

If the velocity is greater than the Nyquist velocity, then it will be unfolded. The routine interpolates values from adjacent valid sectors to any sector missing valid velocity data.

If the velocity difference between two azimuthallyadjacent Windfield Model sectors, $V_{s-1} - V_s$, is greater than VN, where, $V_{s-1}$ = sector velocity of the azimuthallyadjacent Windfield Model sector, which was previously processed $V_s$ = sector velocity of the Windfield Model sector currently being processed, and VN = Nyquist velocity, then two times VN is repeatedly added to $V_s$ until $V_s$ is within VN of $V_{s-1}$. If the velocity difference, $V_s - V_{s-1}$, is greater than VN, then two times VN is repeatedly subtracted from $V_s$ until $V_s$ is within VN of $V_{s-1}$. This de-aliasing process is as shown in the following equation, $$VT_s = V_s + 2I(VN)SGN(V_s - V_{s-1})$$

where, $VT_s$ = de-aliased sector velocity of the current sector

I = number of Nyquist intervals by which the velocity of the current sector deviates from the velocity of the previous sector SGN = signum function which returns the sign of its argument.

No processing is done for the first sector of each radial extent.

Each sector of the elevation scan, which was not updated due to a lack of valid data points, are linearly interpolated with respect to its two azimuthal neighbor's value, if they have been updated, and linearly interpolated with respect to its two radial neighbor's value, if they have been updated. These two interpolated results are then averaged to compute the sector velocity. If only one azimuthal or radial neighbor exists or, if only one was updated, then it is used alone. A unique diagnostic sector flag is set if a sector is de-aliased or is set if a sector is interpolated.

Attached hereto is an Appendix which contains a Program Description Language (PDL) listing of the preferred embodiment of the invention for real time de-aliasing of Doppler velocity data of a Weather Radar System 30. The PDL listing presents a more detailed level of description of the method of the real time de-aliasing. The routines described hereinbefore are decomposed into one or more Program Description Language modules. PDL is directly translated by one of ordinary skill in the art to a higher order programming language such as "C", Fortran or Ada.

This concludes the description of the preferred embodiment of the invention. However, many modifications and alterations will be obvious to one of ordinary skill in the art without departing from the spirit and scope of the inventive concept. For example, the size of the sample for determining the velocity average (VA) in the Process Radials routine, which is four (4) samples in the present preferred embodiment, may vary depending on the noise inherent in the velocity data. Therefore, it is intended that the scope of this invention be limited only by the appended claims.

What is claimed is:

1. A method of operating a processing apparatus of a radar system for real time de-aliasing of Doppler velocity data comprising the steps of:

storing initialization data for a Windfield Model;

adjusting a variable resolution of said Windfield Model depending on an elevation angle and retaining a vector component of the true wind in a plurality of sectors of said Windfield Model;

processing each range gate return signal of said velocity data along a radar dwell by examining adjacent data along said radar dwell and de-aliasing in accordance with an average of previous range gates when said velocity data is continuous and when said velocity data is not continuous using data from said Windfield Model;

operating on said processed velocity data by examining adjacent velocity data of said radar dwells in an azimuthal direction to minimize azimuthal velocity differences; and updating said Windfield Model with said de-aliased velocity data.

2. The method as recited in claim 1 wherein: said step of processing each range gate return signal of said velocity data along a radar dwell by examining adjacent data along said radar dwell and de-aliasing in accordance with an average of previous range gates further comprises the step of determining a difference between the average (VA) of four previous range gates and a current range gate sample ($V_n$) wherein:

(a) if said velocity difference (VA $- V_n$) is greater than a Nyquist velocity (VN), then two times VN is repeatedly added to said current range gate sample ($V_n$) until the magnitude of said velocity difference (VA $- V_n$) is less than or equal to VN; and (b) if the velocity difference ($V_n -$ VA) is greater than said Nyquist velocity (VN), then two times VN is repeatedly subtracted from the current range gate sample ($V_n$) until the magnitude of said velocity difference ($V_v -$ VA) is less than or equal to VN.

3. The method as recited in claim 1 wherein:

said step of operating on said processed velocity data by examining adjacent velocity data of radar dwells in an azimuthal direction further comprises the step of determining differences that exceed a threshold over a finite range and eliminating data anomalies exceeding such threshold by forcing continuity in the azimuthal direction.

4. A method of operating a processing apparatus of a radar system for real time de-aliasing of Doppler velocity data comprising the steps of:

storing initialization data for a Windfield Model;

processing each range gate return signal of said velocity data along a radar dwell by examining adjacent data along said radar dwell and de-aliasing in accordance with an average of previous range gates when said velocity data is continuous and when said velocity data is not continuous using data from said Windfield Model;

operating on said processed velocity data by examining adjacent velocity data of radar dwells in an azimuthal direction to minimize azimuthal velocity differences;

updating said Windfield Model with said de-aliased velocity data and in accordance with a trend in radial velocity samples (TV), a trend in average of the velocities (TA), and velocity differences between adjacent Model sectors.

5. The method as recited in claim 4 wherein:
said step of storing initialization data for said Windfield Model further includes adjusting a variable resolution of said Windfield Model depending on an elevation angle.

6. The method as recited in claim 4 wherein:
said step of processing each range gate return signal of said velocity data along a radar dwell by examining adjacent data along said radar dwell and de-aliasing in accordance with an average of previous range gates further comprises the step of determining a difference between the average (VA) of four previous range gates and a current range gate sample ($V_n$) wherein:
(a) if said velocity difference ($VA - V_n$) is greater than a Nyquist velocity (VN), then two times VN is repeatedly added to said current range gate sample ($V_n$) until the magnitude of said velocity difference ($VA - V_n$) is less than or equal to VN; and
(b) if the velocity difference ($V_n - VA$) is greater than said Nyquist velocity (VN), then two times VN is repeatedly subtracted from the current range gate sample ($V_n$) until the magnitude of said velocity difference ($V_n - VA$) is less than or equal to VN.

7. The method as recited in claim 4 wherein:
said step of operating on said processed velocity data by examining adjacent velocity data of radar dwells in an azimuthal direction further comprises the step of determining differences that exceed a threshold over a finite range and eliminating data anomalies exceeding such threshold by forcing continuity in the azimuthal direction.

8. A method of operating a processing apparatus of a radar system for real time de-aliasing of Doppler velocity data comprising the steps of:
checking for dual scans and when present storing said velocity data of a first scan of said dual scans, said dual scans comprising repeated scans at constant elevation angle;
processing said velocity data of said dual scans using a velocity difference correction function, said dual scans having different pulse repetition frequencies;
storing initialization data for a Windfield Model;
processing each range gate return signal of said velocity data along a radar dwell by examining adjacent data along said radar dwell and de-aliasing in accordance with an average of previous range gates when said velocity data is continuous and when said velocity data is not continuous using data from said Windfield Model; and
updating said Windfield Model with said de-aliased velocity data.

9. The method as recited in claim 8 wherein:
said step of storing initialization data from said Windfield Model further includes adjusting a variable resolution of said Windfield Model depending on an elevation angle.

10. The method as recited in claim 8 wherein:
said step of checking for dual scans further comprises the step of determining an optimal second scan PRF for use during said second scan prior to processing said dual scans velocity data.

11. The method as recited in claim 8 wherein:
said step of processing each range gate return signal of said velocity data along a radar dwell by examining adjacent data along said radar dwell and de-aliasing in accordance with an average of previous range gates further comprises the step of determining a difference between the average (VA) of four previous range gates and a current range gate sample ($V_n$) wherein:
(a) if said velocity difference ($VA - V_n$) is greater than a Nyquist velocity (VN), then two times VN is repeatedly added to said current range gate sample ($V_n$) until the magnitude of said velocity difference ($VA - V_n$) is less than or equal to VN; and
(b) if the velocity difference ($V_n - VA$) is greater than said Nyquist velocity (VN), then two times VN is repeatedly subtracted from the current range gate sample ($V_n$) until the magnitude of said velocity difference ($V_n - VA$) is less than or equal to VN.

12. A method of operating a processing apparatus of a radar system for real time de-aliasing of Doppler velocity data comprising the steps of:
checking for dual scans and when present storing said velocity data of a first scan of said dual scans;
processing said velocity data of said dual scans using a velocity difference correction function, said dual scans having different pulse repetition frequencies;
storing initialization data for a Windfield Model;
processing each range gate return signal of said velocity data along a radar dwell by examining adjacent data along said radar dwell and de-aliasing in accordance with an average of previous range gates when said velocity data is continuous and when said velocity data is not continuous using data from said Windfield Model;
operating on said processed velocity data by examining adjacent velocity data of radar dwells in an azimuthal direction to minimize azimuthal shear velocity differences; and
updating said Windfield Model with said de-aliased velocity data and in accordance with a trend in radial velocity samples (TV), a trend in average of the velocities (TA), and velocity differences between adjacent Model sectors.

13. The method as recited in claim 12 wherein:
said step of checking for dual scans further comprises the step of determining an optimal second scan PRF for use during said second scan prior to processing said velocity data.

14. The method as recited in claim 12 wherein:
said step of storing initialization data for said Windfield Model further includes adjusting a variable resolution of said Windfield Model depending on an elevation angle.

15. The method as recited in claim 12 wherein:
said step of processing each range gate return signal of said velocity data along a radar dwell by examining adjacent data along said radar dwell and de-aliasing in accordance with an average of previous range gates further comprises the step of determining a difference between the average (VA) of four previous range gates and a current range gate sample ($V_n$) wherein:
(a) if said velocity difference ($VA-V_n$) is greater than a Nyquist velocity (VN), then two times VN is repeatedly added to said current range gate sample ($V_n$) until the magnitude of said velocity difference ($VA-V_n$) is less than or equal to VN; and
(b) if the velocity difference ($V_n-VA$) is greater than said Nyquist velocity (VN), then two times VN is repeatedly subtracted from the current range gate sample ($V_n$) until the magnitude of said velocity difference ($V_n-VA$) is less than or equal to VN.

16. The method as recited in claim 12 wherein:
said step of operating on said processed velocity data by examining adjacent data of said radar dwells in an azimuthal direction further comprises the step of determining differences that exceed a threshold over a finite range and eliminating data anomalies exceeding such threshold by forcing continuity in the azimuthal direction.

17. Apparatus for real time -de-aliasing of Doppler velocity data comprising:
means for storing initialization data for a Windfield Model;
means for providing a variable resolution of said Windfield Model depending on an elevation angle and retaining a vector component of the true wind in a plurality of sectors of said Windfield Model;
means coupled to said storing means and a radar signal processing means for processing each range gate return signal of said velocity data along a radar dwell by examining adjacent data along said radar dwell and de-aliasing in accordance with an average of previous range gates when said velocity data is continuous and when said velocity data is not continuous using data from said Windfield Model;
means for operating on said processed velocity data by examining adjacent velocity data of said radar dwells in an azimuthal direction to minimize azimuthal shear velocity differences; and
means for updating said Windfield Model with said de-aliased velocity data.

18. The apparatus as recited in claim 17 wherein:
said means for processing each range gate return signal of said velocity data along a radar dwell and de-aliasing in accordance with an average of previous range gates further comprises means for determining a difference between the average (VA) of four previous range gates and a current range gate sample ($V_n$) wherein:
(a) if said velocity difference ($VA-V_n$) is greater than a Nyquist velocity (VN) then two times VN is repeatedly added to said current range gate sample ($V_n$) until the magnitude of said velocity difference ($VA-V_n$) is less than or equal to VN; and
(b) if the velocity difference ($V_n-VA$) is greater than said Nyquist velocity (VN), then two times VN is repeatedly subtracted from the current range gate samples ($V_n$) until the magnitude of said velocity difference ($V_n-VA$) is less than or equal to VN.

19. The apparatus as recited in claim 17 wherein:
said operating means on said processed velocity data by examining adjacent data of said radar dwells in an azimuthal direction further comprises means for determining differences that exceed a threshold over a finite range to eliminate data anomalies exceeding such threshold by forcing continuity in the azimuthal direction.

20. Apparatus for real time de-aliasing of Doppler velocity data comprising:
means for storing initialization data of a Windfield Model;
means coupled to said storing means and a radar signal processing means for processing each range gate return signal of said velocity data along a radar dwell by examining adjacent data along said radar dwell and de-aliasing in accordance with an average of previous range gates when said velocity data is continuous and when said velocity data is not continuous using data from said Windfield Model;
means for operating on said processed velocity data by examining adjacent velocity data of said radar dwell in an azimuthal direction to minimize azimuthal shear velocity differences; and
means for updating said Windfield Model with said de-aliased velocity data and in accordance with a trend in radial velocity samples (TV), a trend in average of the velocities (TA), and velocity differences between adjacent Model sectors.

21. The apparatus as recited in claim 20 wherein:
said Windfield Model comprises means for varying resolution depending on an elevation angle.

22. The apparatus as recited in claim 20 wherein:
said means for processing each range gate return signal of said velocity data along a radar dwell and de-aliasing in accordance with an average of previous range gates further comprises means for determining a difference between the average (VA) of four previous range gates and a current range gate sample ($V_n$) wherein:
(a) if said velocity difference ($VA-V_n$) is greater than a Nyquist velocity (VN) then two times VN is repeatedly added to said current range gate sample ($V_n$) until the magnitude of said velocity difference ($VA-V_n$) is less than or equal to VN; and
(b) if the velocity difference ($V_n-VA$) is greater than said Nyquist velocity (VN), then two times VN is repeatedly subtracted from the current range gate samples ($V_n$) until the magnitude of said velocity difference ($V_n-VA$) is less than or equal to VN.

23. The apparatus as recited in claim 20 wherein:
said operating means on said processed velocity data by examining adjacent data of said radar dwells in an azimuthal direction further comprises means for determining differences that exceed a threshold over a finite range to eliminate data anomalies exceeding such threshold by forcing continuity in the azimuthal direction.

24. Apparatus for real time de-aliasing of Doppler velocity data comprising:
means for checking for dual scans and when present storing said velocity data of a first scan of dual scans, said dual scans comprising repeated scans at constant elevation angle;
means coupled to said storing means and a radar signal processing means for processing said velocity data of said dual scans using a velocity difference correction function, said dual scans having different pulse repetition frequencies;

means for providing initialization data to a Windfield Model in said storing means; and said processing means further comprises means for processing each range gate return signal of said velocity data along a radar dwell by examining adjacent data along said radar dwell and de-aliasing in accordance with an average of previous range gates when said velocity data is continuous and when said velocity data is not continuous using data from said Windfield Model; and said processing means further comprises means for updating said Windfield Model with said de-aliased velocity data.

25. The apparatus as recited in claim 24 wherein:
said checking means for dual scans further comprises determining an optimal second scan PRF for use during said second scan prior to processing said velocity data.

26. The apparatus as recited in claim 24 wherein:
said Windfield Model comprises means for varying resolution depending on an elevation angle.

27. The apparatus as recited in claim 24 wherein:
said means for processing each range gate return signal of said velocity data along a radar dwell and de-aliasing in accordance with an average of previous range gates further comprises means for determining a difference between the average (VA) of four previous range gates and a current range gate sample ($V_n$) wherein:
(a) if said velocity difference ($VA - V_n$) is greater than a Nyquist velocity (VN) then two times VN is repeatedly added to said current range gate sample ($V_n$) until the magnitude of said velocity difference ($VA - V_n$) is less than or equal to VN; and
(b) if the velocity difference ($V_n - VA$) is greater then said Nyquist velocity (VN), then two times VN is repeatedly subtracted from the current range gate samples ($V_n$) until the magnitude of said velocity difference ($V_n - VA$) is less than or equal to VN.

28. Apparatus for real time de-aliasing of Doppler velocity data comprising:
means for storing velocity data and a plurality of routines for de-aliasing said velocity data;
means coupled to said storing means and a radar signal processing means for checking for dual scans and when present storing said velocity data of a first scan of said dual scans in said storing means comprising repeated scans at constant elevation angles;
means included in said checking means for processing said velocity data of said dual scans using a velocity difference correction function, said dual scans having different pulse repetition frequencies;
means for providing initialization data to a Windfield Model in said storing means;
a process radials routine in said storing means for processing each range gate return signal of said velocity data along a radar dwell by examining adjacent data along said radial dwell and de-aliasing in accordance with an average of previous range gates when said velocity data is continuous and when said velocity data is not continuous using data from said Windfield Model;
a minimize azimuthal shear routine in said storing means for operating on said velocity data by examining adjacent velocity data of said radar dwells in an azimuthal direction to minimize azimuthal shear velocity differences; and
an Update Windfield Model routine in said storing means for updating said Windfield Model with said de-aliased velocity data during the processing of dual scans and a single scan.

29. The apparatus as recited in claim 28 wherein:
said checking means for dual scans further comprises determining an optimal second scan PRF for use during said second scan prior to processing said velocity data.

30. The apparatus as recited in claim 28 wherein:
said Windfield Model comprises means for varying resolution depending on an elevation angle.

31. The apparatus as recited in claim 28 wherein:
said means for processing each range gate return signal of said velocity data along a radar dwell and de-aliasing in accordance with an average of previous range gates further comprises means for determining a difference between he average (VA) of four previous range gates and a current range gate sample ($V_n$) wherein:
(a) if said velocity difference ($VA - V_n$) is greater than a Nyquist velocity (VN) then two times VN is repeatedly added to said current range gate sample ($V_n$) until the magnitude of said velocity difference ($VA - V_n$) is less than or equal to VN; and
(b) if the velocity difference ($V_n - VA$) is greater than said Nyquist velocity (VN), then two times VN is repeatedly subtracted from the current range gate samples ($V_n$) until the magnitude of said velocity difference ($V_n - VA$) is less than or equal to VN.

32. The method as recited in claim 28 wherein:
said minimize azimuthal shear routine for operating on said velocity data by examining adjacent data of said radar dwells in an azimuthal direction further includes determining differences that exceed a threshold over a finite range to eliminate data anomalies exceeding such threshold by forcing continuity in the azimuthal direction.

33. A radar system having apparatus for real time de-aliasing of Doppler velocity data comprising:
means for transmitting a radar beam of said radar system at different pulse repetition frequencies;
means coupled to said transmitting means for processing return signals from said radar beam to obtain said velocity data;
means coupled to said signal processing means for performing said real time de-aliasing of said velocity data;
means for storing in said de-aliasing performing means initialization data for a Windfield Model;
means for adjusting a variable resolution of said Windfield Model depending on an elevation angle and retaining a vector component of the true wind in a plurality of sectors of said Windfield Model;
first routine means in said de-aliasing performing means for checking for dual scans and when present storing in said storing means said velocity data of a first scan of said dual scans and processing said velocity data of said dual scans using a velocity difference correction function, said dual scans having different pulse repetition frequencies at constant elevation angle;
second routine means in said de-aliasing performing means for processing each range gate return signal of said velocity data along a radar dwell of said radar beam by examining adjacent data along said radar dwell and de-aliasing in accordance with an average of precious range gates when said velocity data is continuous and when said velocity data is not continuous using data from said Windfield Model;

third routine means in said de-aliasing performing means for operating on said velocity data by examining adjacent velocity data of said radar dwells in an azimuthal direction to minimize azimuthal shear velocity differences; an fourth routine means in said de-aliasing performing means for updating said Windfield Model during the processing of dual scans and a single scan.

34. The weather radar system as recited in claim 33 wherein:
said first routine means further includes means for determining an optimal second scan PRF for use during said second scan prior to processing said velocity data.

35. The radar system as recited in claim 33 wherein:
said first routine means for processing each range gate return signal of said velocity data along a radar dwell and de-aliasing in accordance with an average of previous range gates further comprises means for determining a difference between the average (VA) of four previous range gates and a current range gate sample ($V_n$) wherein:
(a) if said velocity difference ($VA - V_n$) is greater than a Nyquist velocity (VN) then two times VN is repeatedly added to said current range gate sample ($V_n$) until the magnitude of said velocity difference ($VA - V_n$) is less than or equal to VN; and
(b) if the velocity difference ($V_n - VA$) is greater than said Nyquist velocity (VN), then two times VN is repeatedly subtracted from the current range gate samples ($V_n$) until the magnitude of said velocity difference ($V_n - VA$) is less than or equal to VN.

36. The radar system as recited in claim 33 wherein:
said third routine means for operating on said velocity data by examining adjacent azimuthal velocity data of said radar dwells in an azimuthal direction further includes means for determining differences that exceed a threshold over a finite range and eliminating data anomalies exceeding such threshold by forcing continuity in the azimuthal direction.

* * * * *